United States Patent
Yu et al.

(10) Patent No.: US 11,493,484 B2
(45) Date of Patent: Nov. 8, 2022

(54) ULTRASONIC CORROSION MONITORING

(71) Applicant: BP CORPORATION NORTH AMERICA INC., Houston, TX (US)

(72) Inventors: Linxiao Yu, Plainfield, IL (US); Margarit Lozev, Chapel Hill, NC (US); Thomas Eason, Glen Ellyn, IL (US); Steven Orwig, Perrysburg, OH (US); Christopher Overstreet, Wheaton, IL (US); Hamed Bazaz, Seoul (KR)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 178 days.

(21) Appl. No.: 16/636,329

(22) PCT Filed: Jul. 26, 2018

(86) PCT No.: PCT/US2018/043848
§ 371 (c)(1),
(2) Date: Feb. 3, 2020

(87) PCT Pub. No.: WO2019/027785
PCT Pub. Date: Feb. 7, 2019

(65) Prior Publication Data
US 2020/0166480 A1 May 28, 2020

Related U.S. Application Data

(60) Provisional application No. 62/541,287, filed on Aug. 4, 2017.

(51) Int. Cl.
*G01N 29/44* (2006.01)
*G01B 17/02* (2006.01)
(Continued)

(52) U.S. Cl.
CPC ......... *G01N 29/4463* (2013.01); *G01B 17/02* (2013.01); *G01N 29/0645* (2013.01);
(Continued)

(58) Field of Classification Search
CPC ............... G01N 29/4463; G01N 29/46; G01N 2291/02854; G01N 2291/044; G01N 29/0645; G01N 2291/269; G01B 17/02
(Continued)

(56) References Cited

U.S. PATENT DOCUMENTS 5,497,661 A    3/1996  Stripf et al.
5,648,613 A *  7/1997  Kiefer ................ G01N 29/0672
                                                73/609
(Continued)

FOREIGN PATENT DOCUMENTS

CA    3000420 A1 *  4/2013 ........... G01N 29/225
CN    102156089 A     8/2011
(Continued)

OTHER PUBLICATIONS

International Standard: ASTM E797/3797M-10, Standard Practice for Measuring Thickness by Manual Ultrasonic Pulse-Echo Contact Method, Jan. 2, 2014.
(Continued)

*Primary Examiner* — Lisa M Caputo
*Assistant Examiner* — Rose M Miller
(74) *Attorney, Agent, or Firm* — McDonnell Boehnen Hulbert & Berghoff LLP

(57) ABSTRACT

A method of detecting corrosion in a conduit or container comprises measuring the thickness of a wall of the conduit or container with one or more pulse-echo ultrasound devices, wherein the method comprises the following steps: (i) receiving signals indicative of A-scan data from the one or more pulse-echo ultrasound devices, wherein the A-scan
(Continued)

data comprises a plurality of A-scan spectra; (ii) determining which of the A-scan spectra have a distorted waveform such that a reliable wall thickness measurement cannot be determined; (iii) analysing the A-scan spectra identified in step (ii) as having a distorted waveform to determine one or more A-scan spectral characteristics of each spectrum that are causing the distortion; (iv) resolving the waveform characteristics based on the determined spectral characteristics causing the waveform distortion so as to produce modified A-scan spectra; (v) determining thickness measurements of the wall based on the modified A-scan spectra; and (vi) determining the extent to which the wall has been corroded based on the thickness measurements determined in step (v) and additional thickness determined from A-scan spectra.

39 Claims, 18 Drawing Sheets

(51) Int. Cl.
  *G01N 29/06* (2006.01)
  *G01N 29/46* (2006.01)
(52) U.S. Cl.
  CPC ... *G01N 29/46* (2013.01); *G01N 2291/02854* (2013.01); *G01N 2291/044* (2013.01); *G01N 2291/269* (2013.01)
(58) Field of Classification Search
  USPC .......................................................... 702/39
  See application file for complete search history.

(56) References Cited

U.S. PATENT DOCUMENTS

| | | |
|---|---|---|
| 2010/0109677 A1 | 5/2010 | Fellner |
| 2011/0067497 A1 | 3/2011 | Grubb et al. |
| 2012/0226159 A1 | 9/2012 | Sinclair et al. |
| 2014/0076053 A1* | 3/2014 | Gaudet ............... G21C 17/017 73/588 |
| 2014/0109677 A1 | 4/2014 | Koch et al. |
| 2018/0356370 A1* | 12/2018 | Sutherland ......... G01N 29/4427 |

FOREIGN PATENT DOCUMENTS

| | | |
|---|---|---|
| CN | 104335038 A | 2/2015 |
| CN | 106896064 A | 6/2017 |
| GB | 1040242 A | 8/1966 |
| RU | 2052769 C1 | 1/1996 |
| SU | 1364867 A1 | 1/1988 |
| WO | WO 2006/004734 | 1/2006 |
| WO | WO 2011/112715 | 9/2011 |

OTHER PUBLICATIONS

BSI Standards Publication: BS EN 14127:2011, Non-destructive testing—Ultrasonic Thickness Measurement, Jan. 2, 2014.

* cited by examiner

Fig. 1

Choice the type of analysis you want to do?

- Single Sensor Waveform Analysis
- ○ Multiple Sensor Waveform Analysis

1

GUI to SQL database:
select the sensor/s of interest for analysis

2

Fig. 8
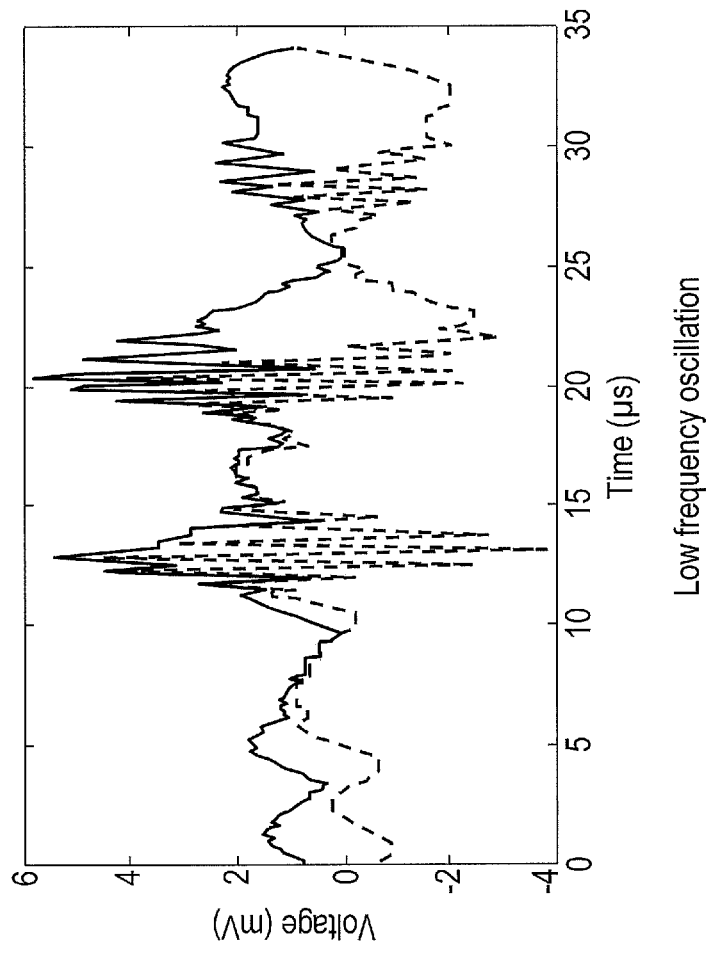
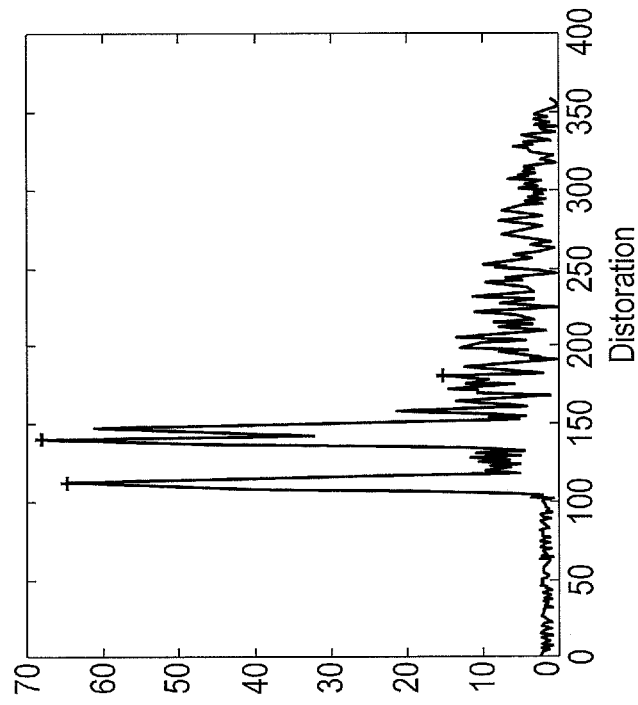

Fig. 12
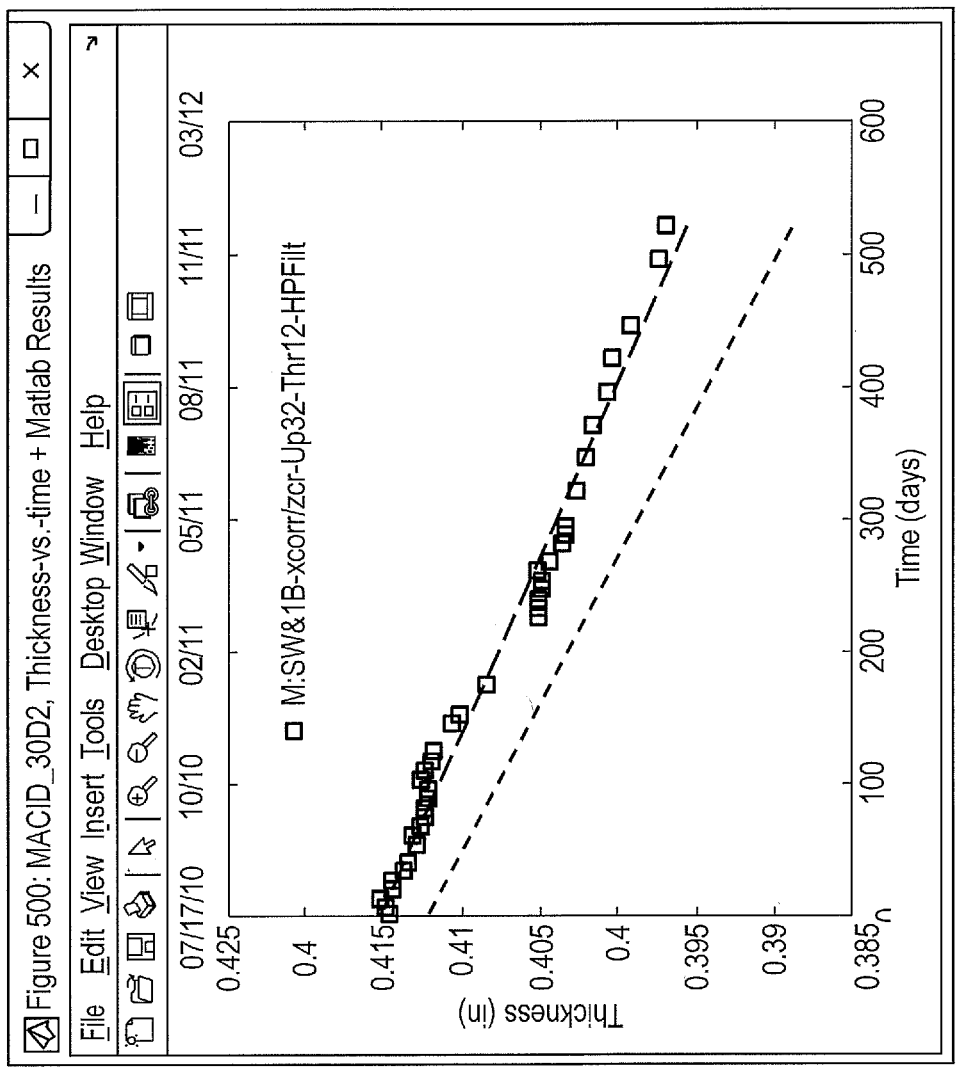
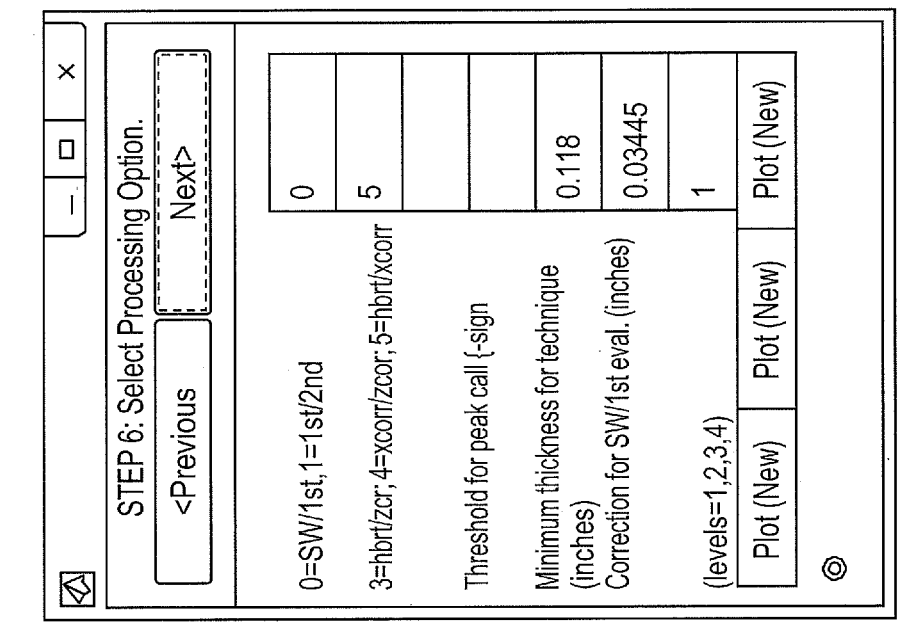

Hilbert/ZCR

Fig. 18
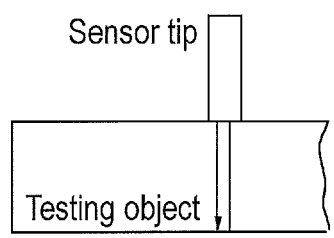
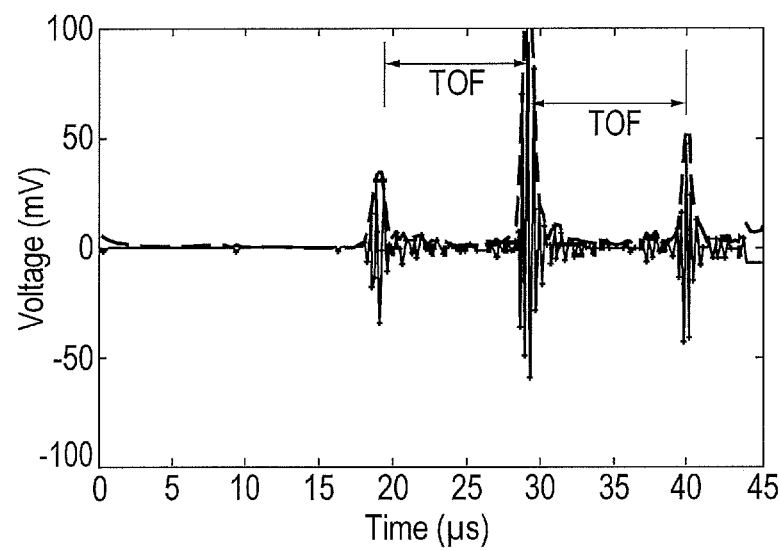
Fig. 19
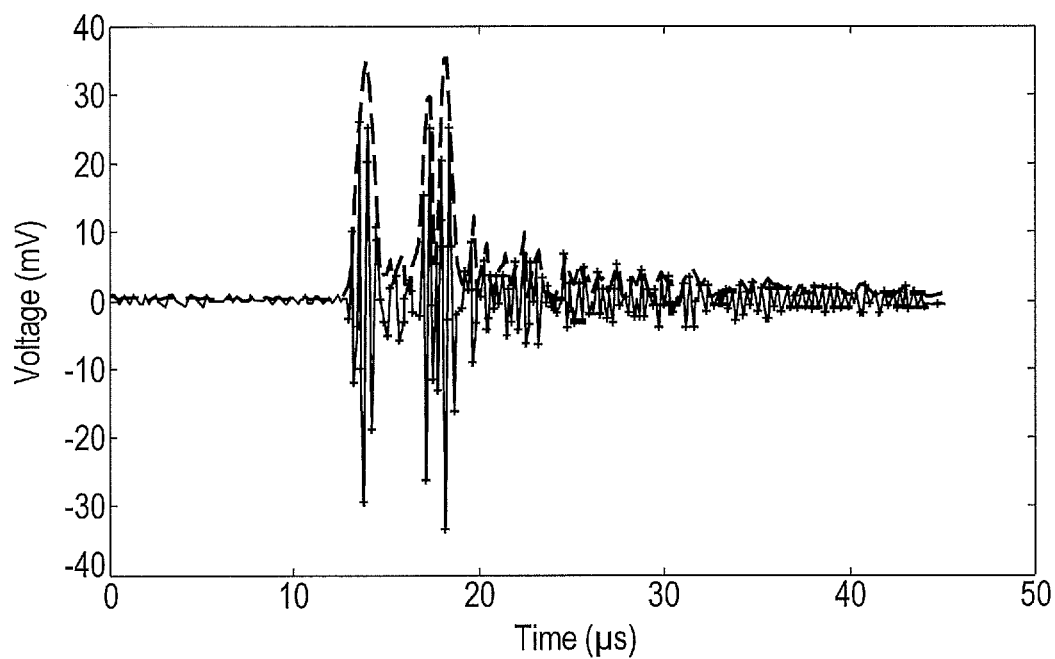

ULTRASONIC CORROSION MONITORING

CROSS REFERENCE TO RELATED APPLICATIONS

This application is a National Phase application of, and claims the benefit of, International (PCT) Application No. PCT/US2018/043848, filed Jul. 26, 2018, which claims the benefit of Provisional U.S. Patent Application No. 62/541,287, filed Aug. 4, 2017, each of which is hereby incorporated by reference in its entirety.

FIELD OF THE INVENTION

The present invention relates to a method of detecting corrosion in a conduit or container using one or more pulse-echo ultrasound devices by determining the thickness of a wall of said conduit or container. The present invention also relates to an apparatus and a non-transitory computer programme product for performing said method.

BACKGROUND TO THE INVENTION

Corrosion of pipes, storage containers and other vessels is a common problem in the oil and gas industry. Oil and natural gas transportation pipelines, refineries and petrochemical plants have serious corrosion problems. Common causes of corrosion of pipes and vessels in the oil and gas industry are water, carbon dioxide ($CO_2$) and hydrogen sulfide ($H_2S$) which may be present in small quantities within the hydrocarbons. Corrosion can also be aggravated by microbiological activity.

A common way of determining the extent of corrosion of a wall of a conduit or container is to determine the thickness of said wall. A higher extent of corrosion will mean that a portion of the wall is thinner, whilst a lower extent of corrosion will be indicated by a thicker portion of wall since less of the metal has been corroded.

A common way of determining the thickness of a wall as an indicator of the extent of corrosion is to use an ultrasonic thickness measurement technique such as a 0° pulse-echo ultrasound probe. Such techniques are useful for fitness for service assessments which require accurate values. In addition, there is then often a need to monitor the reduction in remaining thickness that may take place between repeat inspections made typically several years apart. As corrosion rates are generally a small fraction of a millimetre per year, a high measurement accuracy and repeatability is needed to measure these corrosion rates with any reliability, even if the repeat inspections are separated by many years.

There are many types of ultrasonic corrosion inspection techniques ranging from simple manual spot corrosion gauges to sophisticated corrosion monitoring, mapping and screening systems. The basic principle of these techniques involves the extraction of the ultrasonic time-of-flight (TOF) or transit time from the "A-scan" ultrasonic signal. Techniques of ultrasonic thickness measurements for determining corrosion in the walls of pipes and vessels in the oil and gas industry are covered by various International standards such as ASTM E797/E797M-10 and EN14127:2011. Thickness (T), when measured by the pulse-echo ultrasonic method, is a product of the velocity of sound in the material and one half the transit time (round trip) through the material, and is determined by the following formula:

$$T = Vt/2, \text{ where: } T=\text{thickness}; V=\text{velocity}; \text{ and } t=\text{transit time}$$

The pulse-echo ultrasonic instrument measures the transit time of the ultrasonic pulse through the part. FIG. 18 is a diagram showing how time of flight is deduced from an A-scan spectrum with a good quality waveform.

The pulse-echo ultrasonic instruments measure the transit time from the A-scan ultrasonic signal. The quality of the waveform of this A-scan has a direct impact on the reliability of the wall thickness measurement. The quality of the waveform can be defined by certain attributes of the waveform signal such as amplitude, signal-to-noise-ratio (SNR), distortion, time shifting and spectrum content. When the quality of the waveform is poor or inadequate, time of flight may be hard to process. As a result, the inspection gauge/monitoring system may produce non-intuitive or even misleading thickness readings meaning that the extent of corrosion of the wall is difficult to monitor.

Various attempts in the art have been made to try and alleviate the problems associated with poor or inadequate quality waveform A-scan spectra. Many of these include using algorithms to try and process the waveform signal with inferior quality to try and improve the quality of the waveform such that a reliable thickness measurement can be determined.

U.S. Pat. No. 5,497,661 discloses digitally filtering and parameterizing reflected ultrasound pulses wherein for each reflected pulse the time and amplitude are detected for the maximum and for when a digital threshold value is exceeded or fallen short of.

US201/0109677 discloses a method for determining a thickness of an object which comprises applying a signal identification algorithm to at least one pair of maximum amplitude peaks in a digitized received echo sequence of ultrasonic signals; interpolating at least one of the maximum amplitude peaks in the digitized received echo sequence; measuring a time duration between the at least pair of maximum amplitude peaks and determining the thickness of the object based on the time duration.

US2012/0226159 discloses an ultrasonic signal processing method comprising: deconvolving the received ultrasonic signal to yield a filtered signal; determining autoregressive extrapolation parameters based on frequency amplitude fluctuations of the filtered signal within a frequency range over which a corresponding reference signal has a high signal-to-noise ratio; and carrying out an autoregressive spectral extrapolation of the filtered signal using the autoregressive extrapolation parameters to yield an enhanced ultrasonic signal.

Despite the existence of signal processing techniques for ultrasonic thickness measurements such as those discussed above, there exists a continued need for improved methods of processing ultrasonic thickness measurements where the waveform is of poor quality to improve the accuracy and reliability of thickness measurements for corrosion determination.

SUMMARY OF THE INVENTION

Aspects of the invention are as set out in the appended claims.

Embodiments of the present disclosure provide interactive data analysis tools and methods capable of processing waveform signals with inferior quality such that more accurate and reliable thickness measurements can be determined. This may enable improved monitoring of corrosion in walls such as those in pipelines and vessels used in the oil and gas industry.

According to a first aspect of the disclosure, there is provided a method of detecting corrosion in a conduit or container, wherein the method comprises measuring the thickness of a wall of the conduit or container with one or more pulse-echo ultrasound devices, wherein the method comprises the following steps:

(i) receiving signals indicative of A-scan data from the one or more pulse-echo ultrasound devices, wherein the A-scan data comprises a plurality of A-scan spectra;

(ii) determining which of the A-scan spectra have a distorted waveform such that a reliable wall thickness measurement cannot be determined;

(iii) analysing the A-scan spectra identified in step (ii) as having a distorted waveform to determine one or more A-scan spectral characteristics of each spectrum that are causing the distortion;

(iv) resolving the waveform characteristics based on the determined spectral characteristics causing the waveform distortion so as to produce modified A-scan spectra;

(v) determining thickness measurements of the wall based on the modified A-scan spectra; and (vi) determining the extent to which the wall has been corroded based on the thickness measurements determined in step (v) and additional thickness measurements determined from A-scan spectra.

According to a second aspect of the disclosure, there is provided a method for detecting corrosion in a conduit or container for use with ultrasound data obtained from one or more pulse-echo ultrasound devices comprising:

receiving signals indicative of ultrasound data, the ultrasound data comprising at least one waveform;

determining that the ultrasound data comprises at least one distorted waveform feature;

in response to determining that the received signals comprise ultrasound data comprising at least one distorted waveform feature, determining a correction to apply to the data based on a characteristic of the determined at least one distorted waveform feature, for resolving or correcting the at least one distorted waveform feature and obtaining a thickness measurement from the resolved or corrected data.

According to a third aspect of the disclosure, there is provided an apparatus configured to perform a method of detecting corrosion in a conduit or container, wherein the method comprises measuring the thickness of a wall of the conduit or container with one or more pulse-echo ultrasound devices, wherein the apparatus is configured to:

(i) receive signals indicative of A-scan data from the one or more pulse-echo ultrasound devices, wherein the A-scan data comprises a plurality of A-scan spectra;

(ii) determine which of the A-scan spectra have a distorted waveform such that a reliable wall thickness measurement cannot be determined;

(iii) analyse the A-scan spectra identified in step (ii) as having a distorted waveform to determine one or more A-scan spectral characteristics of each spectrum that are causing the distortion;

(iv) resolve the waveform characteristics based on the determined spectral characteristics causing the waveform distortion so as to produce a plurality of resolved A-scan spectra;

(v) determine thickness measurements of the wall based on the plurality of resolved A-scan spectra; and (vi) determine the extent to which the wall has been corroded based on the thickness measurements determined in step (v) and additional thickness measurements determined from A-scan spectra.

According to a fourth aspect of the disclosure, there is provided an apparatus configured to perform the method of the second aspect of the disclosure.

According to a fifth aspect of the disclosure, there is provided a non-transitory computer programme product comprising programme instructions configured to perform the method of the first or second aspects of the disclosure.

BRIEF DESCRIPTION OF THE DRAWINGS

Embodiments of the disclosure will now be described, by way of example only and with reference to the accompanying drawings, in which;

FIG. 1 is a screenshot from the graphical user interface (GUI) of a software tool implementing methods of the disclosure giving the user a choice between single sensor or multiple sensor analysis mode;

FIG. 8 shows examples of spectra where general distortion and low frequency oscillation are responsible for the waveform distortion;

FIGS. 11 and 12 are screenshots from the GUI where a particular corrective action is proposed to the user on account of specific spectral characteristics having been determined as causing the waveform distortion;

FIG. 18 is a diagram showing how time of flight (as an indicator) of thickness is measured from an A-scan spectrum;

FIG. 19 is an example of an A-scan determined by to have a distorted waveform;

DETAILED DESCRIPTION

Any of the technical features discussed below in accordance with a specific aspect of the disclosure may also be part of all other aspects of the disclosure.

Figure 2A:
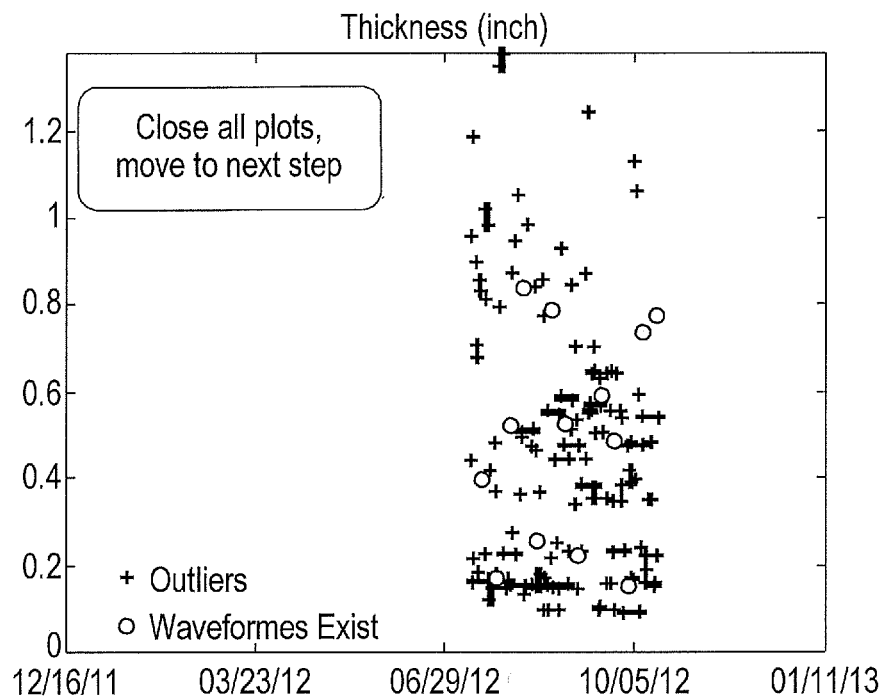
FIG. 2(a) is graph showing various thickness measurements taken over time, with outliers identified, and outliers where the A-scan of the outlier may be analysed.

The methods of the present disclosure can be used to determine corrosion by measuring the thickness of a wall of any suitable pipe, vessel or container. Corrosion may be determined by measuring the thickness of the wall over a period of time and determining whether the wall has thinned as a function of time (for example, as shown in FIG. 2*a*). This may be done by comparing reference data values, such as previous thickness measurements (for example obtained via previous A-scan spectra), with a current data value (thickness measurement yielded by a current A-scan spectra), to ascertain how thickness changes over time. In some examples the wall may comprise the wall of an oil or natural gas transportation pipeline. Additionally or alternatively, the wall may comprise the wall of a conduit or container in an oil refinery or natural gas processing plant.

In summary, embodiments of the disclosure may comprise a method of detecting corrosion in a conduit or container for use with ultrasound data obtained from one or more pulse-echo ultrasound devices. Embodiments of the disclosure may comprise receiving signals indicative of ultrasound data, the ultrasound data comprising at least one waveform, and determine that the ultrasound data comprises at least one distorted waveform feature. In response to determining that the received signals comprise ultrasound data comprising at least one distorted waveform feature, a correction to apply to the data may be determined based on a characteristic of the determined at least one distorted waveform feature, for resolving or correcting the at least one distorted waveform feature and obtaining a thickness measurement from the resolved or corrected data. Embodiments of the disclosure may employ a time of flight analysis (as described above and as shown in FIG. 18) to determine a thickness value from the A-scan data.

Embodiments of the disclosure may therefore provide more reliable thickness measurement data (for example of a pipe) and thereby provide an improved and/or more accurate determination of whether corrosion in a pipe has occurred. This in turn may therefore allow remedial action to be taken to address the corrosion before a leak of any liquid carried in the pipe occurs, which would have a clear environmental benefit.

The pulse-echo ultrasound device used in embodiments of the disclosure may be any pulse-echo ultrasound device suitable for measuring the thickness of a wall or container. Such pulse-echo ultrasound devices are known to the skilled person. Examples of suitable pulse-echo ultrasound devices for use in accordance with the disclosure can be found in various International standards such as ASTM E797/E797M-10 and EN14127:2011.

The pulse-echo ultrasound device may produce a plurality of A-scan data, for example respective A-scan data sets for a particular section of wall over a period of time. Receiving signals indicative of ultrasound data may comprise receiving signals indicative of the A-scan data. The ultrasound data, and therefore the A-scan data, may comprise at least one waveform. Of the many A-scans obtained in ultrasonic thickness measurements, some may have a distorted waveform. As noted above, the A-scan data may be used to determine a thickness measurement, for example a thickness measurement of a section of wall. If the A-scan data is distorted, the thickness measurement indicated by the underlying A-scan may not be accurate or reliable, for example an anomalous thickness measurement may be yielded for that particular section of the wall.

As noted above, embodiments of the disclosure may comprise determining that the ultrasound data comprises at least one distorted waveform feature. For example, it may be determined that the received signals comprise ultrasound data comprising at least one distorted waveform feature.

Determining that the ultrasound data comprises at least one distorted waveform feature may comprise one or more of the following steps (in isolation or in combination):

(i) determining that a selected portion of the ultrasound data comprises at least one outlier, wherein an outlier comprises a feature of that waveform that is outside a selected range for that feature;

(ii) determining that the quality of the ultrasound data is below a selected threshold;

(iii) determining that the overall waveform features, or characteristics of the waveform of a selected portion of the ultrasound data, are outside a selected threshold;

(iv) determining whether the peak characteristics of a selected portion of the ultrasound data are outside a selected threshold;

(v) determining whether a selected portion of the ultrasound data comprises a signal to noise ratio lower than a selected threshold;

(vi) determining whether a selected portion of the ultrasound data comprises localised precursors; and (vii) determining whether a selected portion of the ultrasound data comprises low frequency oscillations.

Determining whether or not peak characteristics of a selected portion of the ultrasound data are outside a selected threshold (item (iv) identified above) may comprise one or more of the following steps:

determining that the separation between peaks of a selected portion of the ultrasound data is below a selected threshold;

determining that the number of peaks for a selected portion of the ultrasound data is below and/or above selected thresholds;

comparing the absolute value of peaks for a selected portion of the ultrasound data with the absolute value of peaks for another portion of the ultrasound data.

In some examples, determining that the ultrasound data comprises at least one distorted waveform feature may therefore comprise determining that a particular data value, such as a thickness value yielded by the underlying data (such as the underlying A-scan spectra), is an outlier.

Determining that the ultrasound data comprises an outlier (indicative of a distorted waveform feature) may comprise comparing the ultrasound data (such as the current A-scan spectra or a thickness measurement indicated by the underlying A-scan spectra) to a reference data set, such as previous A-scan spectra and/or previous thickness measurements. In some examples, an outlier may be defined as a value that sits outside (for example above or below) a threshold level with respect to a reference data set. For example, the outlier may comprise an amplitude above or below a selected threshold for a selected portion of the ultrasound data. For example, ultrasound data may be determined to comprise a distorted waveform feature if it yields a thickness that is much thicker than previous measurements (as will be described in more detail below).

The reference data set may be a previous data set or a previous measurement. For example, a reference data set may be previous thickness measurements, with the outlier being an anomalous thickness measurement compared to previous measurements. In other examples, the reference data set may be the surrounding A-scan spectrum, with the outlier being a value within that A-scan spectrum. The threshold with respect to the reference data set may be based on a median or average value of an A-scan spectrum.

In some examples, an outlier is defined as being more than one standard deviation from the mean value of a reference data set, such as a previous measurement. Additionally or alternatively, an outlier may be defined as being more than one standard deviation from the mean value of one or more spectral characteristics of the A-scan spectra.

In some examples, an outlier is defined as being more than two, three, four or five standard deviations from the mean value of a reference data set and/or the one or more spectral characteristics of the A-scan spectra. In some examples, whether or not a value for a spectral characteristic is an outlier may be determined using the following formula: $(Y_i - Y_{median}) > 3 IQR$, wherein $Y_i$ is the value (such as the present data value in question), $Y_{median}$ is the median value of a group of values (such as of the reference data set), and IQR is the interquartile range of a group of values.

Figure 20:
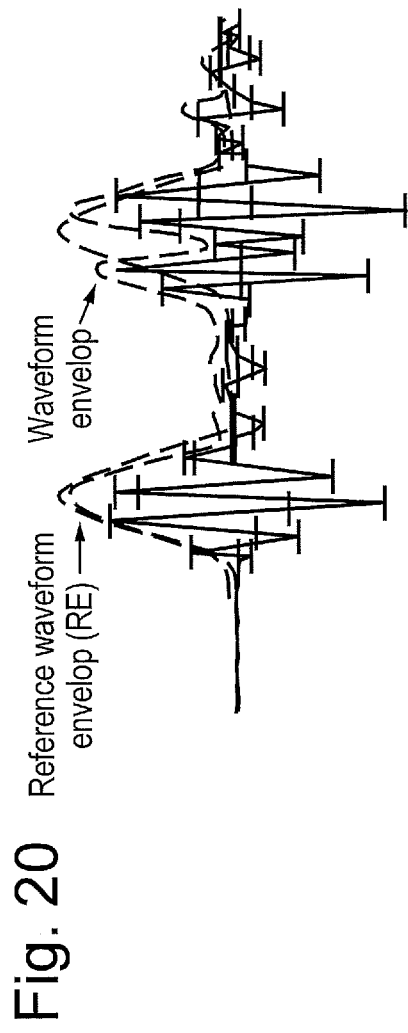
FIG. 20 is a diagram comparing a specific waveform envelope to a reference waveform envelope.

In some examples, whether or not a value is an outlier may be determined using the following formula: $(Y_i - Y_{median}) > 10\% (Y_{median})$ and $(Y_i - Y_{median}) > \max(0.04$ inch, $5\% (Y_{median}))$. In some embodiments whether or not a value for a spectral characteristic is an outlier may be determined using the formula $Ru = \Sigma^N_{i=1} (Y_i - RE_i)^2$, where $Y_i$ is the present waveform envelope value, $RE_i$ is the corresponding reference waveform envelop value, and Ru is a variable to quantify deviation of the waveform envelope from a normalised reference waveform envelope. This is also shown in FIG. 20.

In some examples, an outlier is determined by comparing a value with the route mean square of a group of values (such as the reference data set). This may involve determining that a value is an outlier if the value differs from the root mean square of the reference data set by more than a certain threshold value. This method may be preferred in examples where it is desirable to determine whether or not a poor/inadequate signal-to-noise ratio is causing the thickness measurement to be an outlier.

In response to determining that the received signals comprise ultrasound data comprising at least one distorted waveform feature, embodiments of the disclosure comprise determining a correction to apply to the data. Embodiments of the disclosure may further comprise applying the determined correction to the data to obtain improved data, for example to obtain an improved thickness measurement. For example, embodiments of the disclosure may comprise correcting the at least one distorted waveform feature using the determined correction, determining a thickness measurement of a wall of the conduit or container based on the corrected data and uncorrected data, and determining the extent to which the wall has been corroded based on the determined thickness. In some examples this may comprise determining from the received signals a plurality of different types of distorted waveform features and applying a correction to the data specific to each different type of determined distorted waveform feature.

Applying a correction may comprise using an algorithm to correct the A-scan data such that a reliable thickness measurement may be determined. Suitable algorithms include Fast Fourier Transform (FFT), Hilbert transform algorithm, Hilbert threshold algorithm, and Hilbert ZCR (Zero Crossing) algorithm. Optionally, these algorithms can be applied using the MATLAB software.

In some examples, applying a correction may comprise excluding a data value or data set comprising an outlier. For example, if a set of A-scan data obtained on a particular data indicates a thickness measurement that could be considered an outlier (for example it is anomalous), applying a correction may comprise excluding that particular A-scan spectrum obtained on that date.

Determining a correction to apply to the data may comprise analysing the A-scan spectra identified as having a distorted waveform to determine one or more A-scan spectral characteristics of each spectrum that are causing the distortion. For example, the step of determining a correction to apply to the data may comprise determining a correction to apply to the data based on a characteristic of the determined at least one distorted waveform feature, for correcting the at least one distorted waveform feature and obtaining a thickness measurement from the corrected data. This step may further comprise correcting the at least one distorted waveform feature using the determined correction; determining a thickness measurement of a wall of the conduit or container based on the corrected data, uncorrected data or both; and determining the extent of corrosion based on the determined thickness.

As noted above, the term distorted waveform as used herein may mean that one or more spectral characteristics of the A-scan spectrum causes an inaccurate or unreliable thickness measurement to be determined from the A-scan spectrum or that no thickness measurement at all is determinable from the A-scan spectrum.

The spectral characteristic may be any characteristic of the A-scan spectrum that prevents an accurate and reliable thickness measurement to be obtained from the spectrum. The one or more spectral characteristics may comprise one or more features of the overall waveform. For example, the one or more spectral characteristics may comprise peak amplitude, peak amplitude ratio, DC offset, signal distortion, signal to noise ratio (S/N), the inverse of the signal to noise ratio (1/(S/N)), low frequency oscillation, localised corrosion precursors, or any combination thereof.

Additionally or alternatively, analysing the A-scan spectra identified as having a distorted waveform to determine one or more A-scan spectral characteristics of each spectrum that are causing the distortion may comprise analysing one or more peak characteristics. The one or more peak characteristics may comprise peak amplitude, peak amplitude ratio, peak separation, the number of peaks, peak ratio, neighbouring values around the peaks, or any combination thereof.

Figure 7:
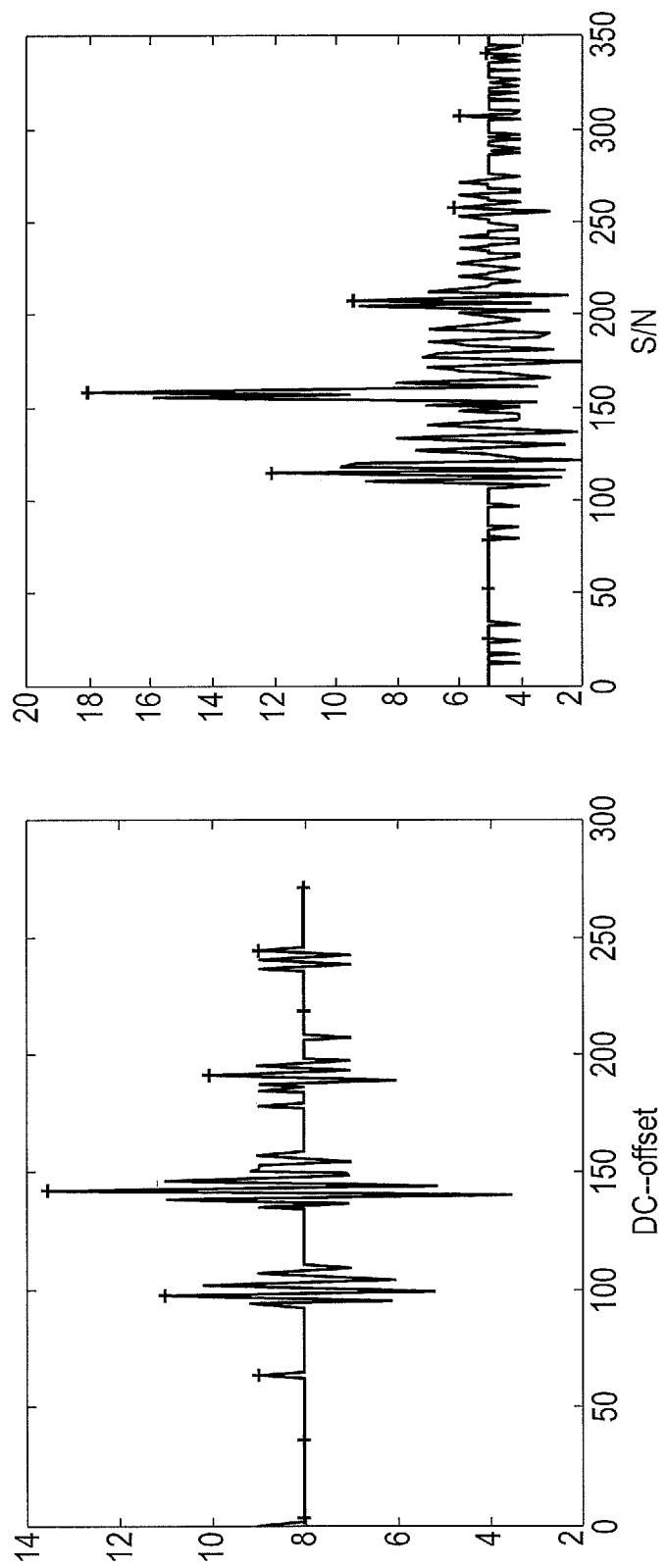
FIG. 7 shows examples of spectra where DC-offset and signal to noise ratio are responsible for the waveform distortion.
Figure 21:
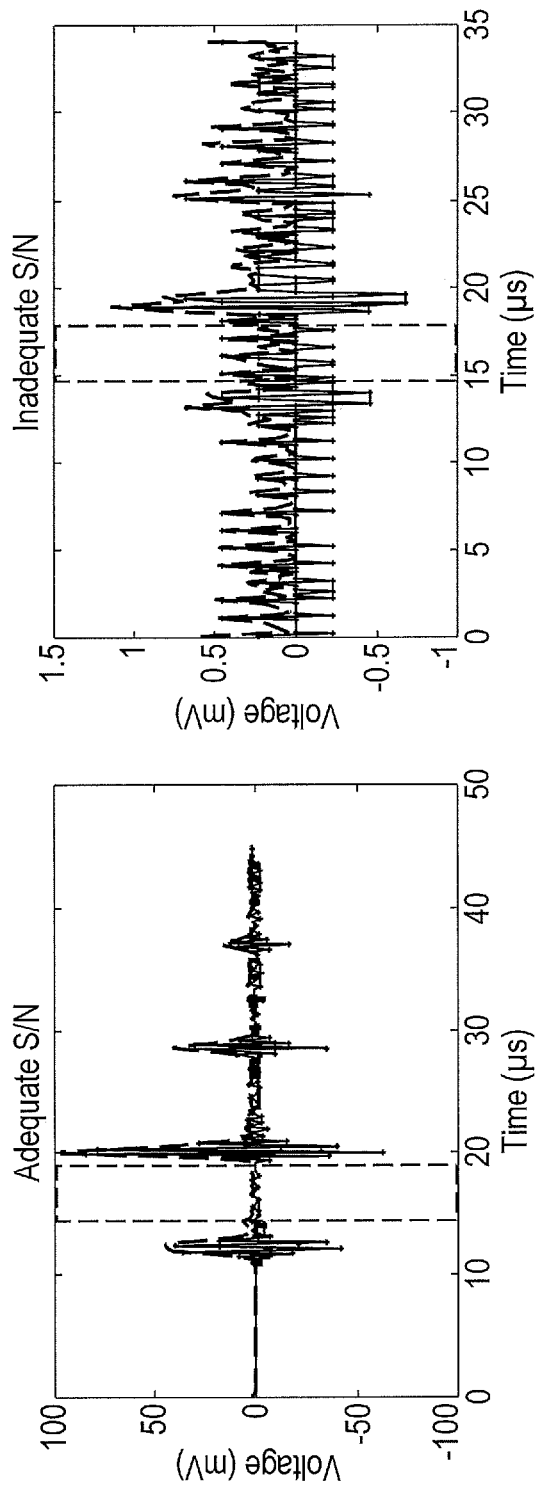
FIG. 21 is a diagram showing an A-scan spectrum determined to have an adequate signal to noise ratio for providing a reliable thickness measurement compared to a spectrum determined to have an inadequate signal to noise ratio to determine a reliable thickness measurement.

As noted above, many properties of the A-scan spectrum may be responsible for causing the at least one distorted waveform feature. Examples of these are shown in the appended Figures. For example, FIG. 19 shows an example of a waveform determined to be sufficiently distorted such that a reliable thickness measurement cannot be determined. FIG. 21 contrasts an A-scan spectrum determined to have an adequate signal to noise ratio for a reliable thickness measurement to be determined against one that has an inadequate signal to noise ratio for a reliable thickness measurement to be determined. FIG. 7 shows examples of spectra where DC-offset and signal to noise ratio are responsible for the waveform distortion. FIG. 8 shows examples of spectra where general distortion and low frequency oscillation are responsible for the waveform distortion.

In some examples, methods of the disclosure may further comprise determining from the received signals a plurality of different types of distorted waveform features and applying a correction to the data specific to each different type of determined distorted waveform feature.

Other embodiments of the disclosure comprise a method of detecting corrosion in a conduit or container, wherein the method comprises measuring the thickness of a wall of the conduit or container with one or more pulse-echo ultrasound devices, wherein the method comprises the following steps:

(i) receiving signals indicative of A-scan data from the one or more pulse-echo ultrasound devices, wherein the A-scan data comprises a plurality of A-scan spectra;

(ii) determining which of the A-scan spectra have a distorted waveform such that a reliable wall thickness measurement cannot be determined;

(iii) analysing the A-scan spectra identified in step (ii) as having a distorted waveform to determine one or more A-scan spectral characteristics of each spectrum that are causing the distortion;

(iv) resolving the waveform characteristics based on the determined spectral characteristics causing the waveform distortion so as to produce modified A-scan spectra;

(v) determining thickness measurements of the wall based on the modified A-scan spectra; and (vi) determining the extent to which the wall has been corroded based on the thickness measurements determined in step (v) and additional thickness measurements determined from A-scan spectra.

Step (ii) of determining which of the A-scan spectra have a distorted waveform such that a reliable wall thickness measurement cannot be determined may comprise any suitable means of determining whether or not an A-scan spectrum has a distorted waveform, for example as described above. The step of determination can be as simple as a visual inspection followed by making a decision on the basis of the inspection, or it may comprise determining whether or not the A-scan spectrum fulfils certain specific criteria.

Step (ii) of determining which of the A-scan spectra have a distorted waveform such that a reliable wall thickness measurement cannot be determined may comprise determining whether or not one or more spectral characteristics of the A-scan spectra are outliers, as described above. For example, determining that the ultrasound data comprises an outlier (indicative of a distorted waveform feature) may comprise comparing the ultrasound data (such as the current A-scan spectra or a thickness measurement indicated by the underlying A-scan spectra) to a reference data set, such as previous A-scan spectra and/or previous thickness measurements. For example, ultrasound data may be determined to comprise a distorted waveform feature if it yields a thickness that is much thicker than previous measurements.

Step (iii) of analysing the A-scan spectra to determine one or more A-scan spectral characteristics that are causing the distortion may comprise mapping the one or more spectral characteristics as a function of time.

Step (iii) of analysing the A-scan spectra identified in step (ii) as having a distorted waveform to determine one or more A-scan spectral characteristics of each spectrum that are causing the distortion may also comprise analysing whether or not one or more specific spectral characteristics are outliers.

Step (iii) of analysing the A-scan spectra identified in step (ii) as having a distorted waveform to determine one or more A-scan spectral characteristics of each spectrum that are causing the distortion may comprise comparing the one or more A-scan spectra with one or more previous A-scan spectra, or one or more nominal A-scan spectra to determine the one or more A-scan spectral characteristics that are causing the distortion.

Step (iv) of applying a means for resolving the waveform characteristics determined in step (iii) to be causing the waveform distortion so as to produce modified A-scan spectra may comprise removing outliers from the A-scan spectra. This might entail only taking into account A-scan spectra for the thickness measurements that do not have one or more spectral characteristics that are considered to be outliers. The definition of an outlier may be any of the definitions for the term discussed above. This may be the preferred method for resolving the waveform characteristics determined in step (iii) to be causing the waveform distortion when the spectral characteristic responsible for the waveform distortion comprises a poor or inadequate signal-to-noise ratio.

Step (iv) of applying a means for resolving the waveform characteristics determined in step (iii) to be causing the waveform distortion so as to produce modified A-scan spectra may comprise producing a plurality of corrected A-scan spectra.

Where step (iv) comprises producing a plurality of corrected A-scan spectra, this step may comprise using an algorithm to correct the A-scan data such that a reliable thickness measurement may be determined. Steps (ii) and (iii) may also comprise using an algorithm to determine which of the A-scan spectra have a distorted waveform such that a reliable thickness measurement cannot be determined or using an algorithm to analyse which spectral characteristics are responsible for the waveform distortion. Suitable algorithms include fast Fourier transform, Hilbert transform algorithm, Hilbert threshold algorithm, and Hilbert ZCR algorithm. Optionally, these algorithms can be applied using the MATLAB software.

The methods of the present disclosure can be carried out by a computer coupled to one or more pulse-echo ultrasound devices. The computer may operate separately from the pulse-echo ultrasound devices (for example A-scan spectra may have been obtained previously or from elsewhere) or the computer may control the one or more pulse-echo ultrasound devices. The computer will include software, e.g. for implementing software to carry out the methods of the disclosure, and hardware for executing the software. The computer may contain interfaces for receiving, transmitting and/or otherwise communicating information e.g. in the form of data. The computer may contain memory elements to store information.

In some examples, a plurality of pulse-echo ultrasound devices may be situated along the wall of an oil or natural gas transportation pipeline. All of these devices may be used to monitor thickness of the wall at different locations so as to provide an indication of corrosion at different parts of the wall. The method of the present disclosure may comprise processing the A-scan data from these pulse-echo ultrasound devices according to any of the methods described above.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

EXAMPLES

Example 1

Figure 2B:
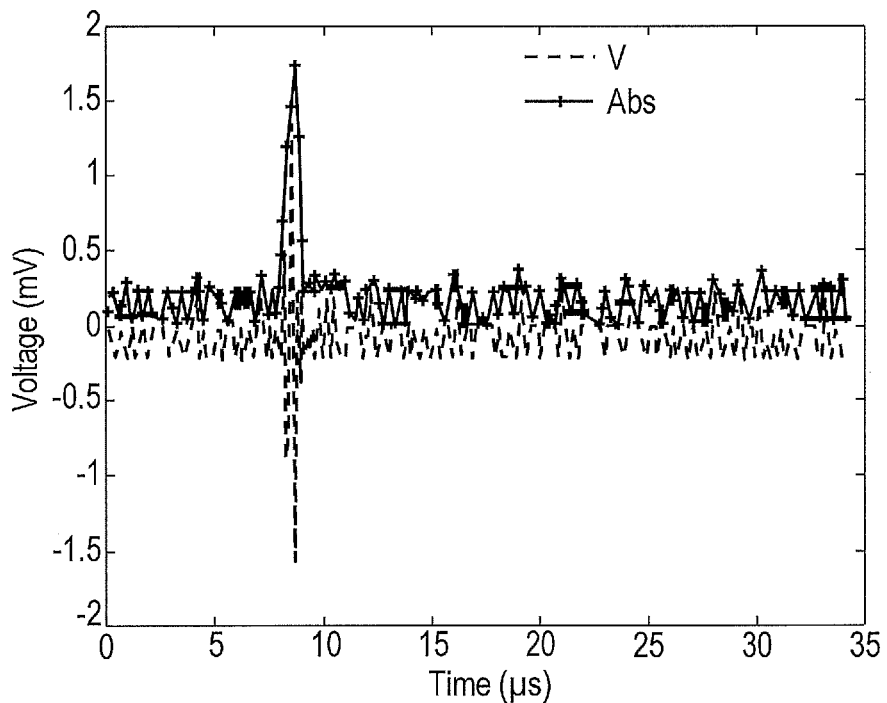
FIG. 2(b) is an example A-scan of an outlier thickness reading from the graph of FIG. 2(a)

Example 1 relates to a software tool implementing the methods discussed above. FIG. 1 is a screenshot from the graphical user interface (GUI) of the tool, before any A-scan analysis is carried out. As can be seen from the figure, the user may select whether A-scan data from a single sensor (single pulse-echo ultrasound device) is analysed, or whether A-scan data from multiple sensors is analysed. For the multiple sensor analysis mode, a user may select certain specific groups of sensors to analyse, or may select all sensors from a site to analyse. FIG. 2a is a screenshot from the GUI that shows a plot of thickness against time for a particular sensor. The software has determined that the ultrasound data comprises at least one distorted waveform feature, and in the present case this comprises determining that the ultrasound data comprises at least one outlier. In the present example, highlighted in red are readings that are outlier thickness measurements. Highlighted in yellow and red are outliers for which waveform data is available. For those outliers for which waveform data is available, the software tool allows the raw A-scan data for a particular outlier to be viewed by clicking on the outlier value within the GUI. By viewing the raw A-scan data, a correction to apply to the distorted waveform feature may be determined. FIG. 2b is a screenshot of one of such raw A-scan data for a thickness measurement deemed to be an outlier.

Figure 3A:
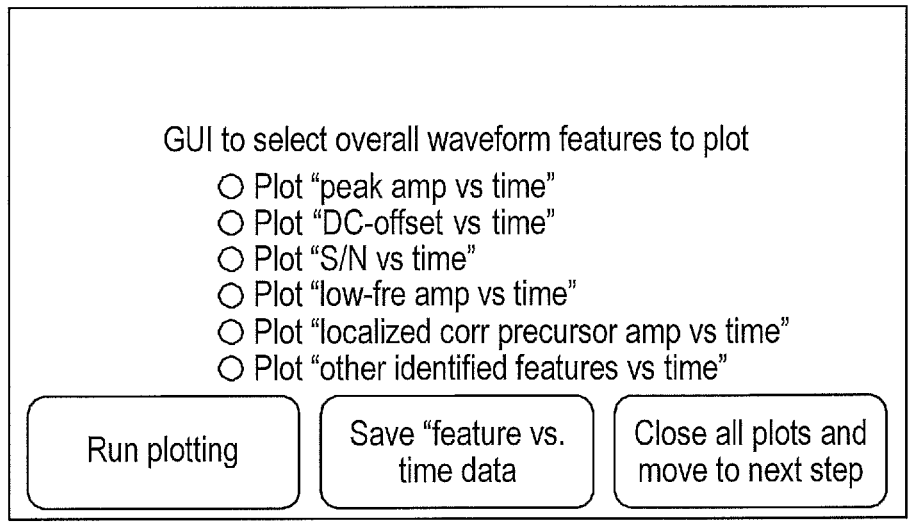
FIGS. 3(a) and 3(b) are screenshots from the GUI of a software tool implementing methods of the disclosure, such as the software tool of FIG. 1, giving the user a choice to map one or more spectral characteristics of an A-scan spectrum as a function of time.
Figure 3B:
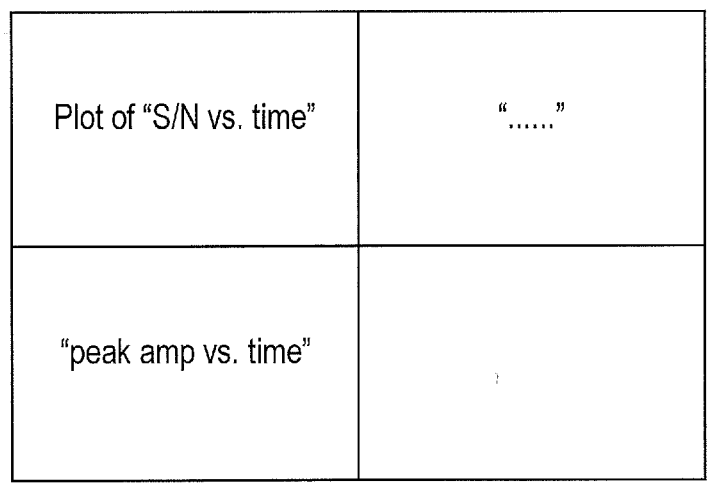

For example, once a specific A-scan spectrum deemed to be an outlier is viewed, the A-scan spectrum can be analysed by the software tool to determine whether or not one or more specific spectral characteristics of the A-scan spectrum is responsible for the distorted waveform. As discussed above, this analysis of the one or more specific spectral characteristics may comprise mapping one or more spectral characteristics as a function of time. FIGS. 3a and 3b are screenshots from the GUI of the software tool providing the user with various options for mapping certain spectral characteristics of the A-scan spectrum as a function of time. The user may be able to view the spectral characteristics themselves and determine whether they need correcting. Additionally or alternatively, the software may determine which spectral characteristics need correcting by any of the methods described above (and as will be described in more detail below). As described above, the software may use an algorithm to correct the selected spectral characteristics.

Figure 4:
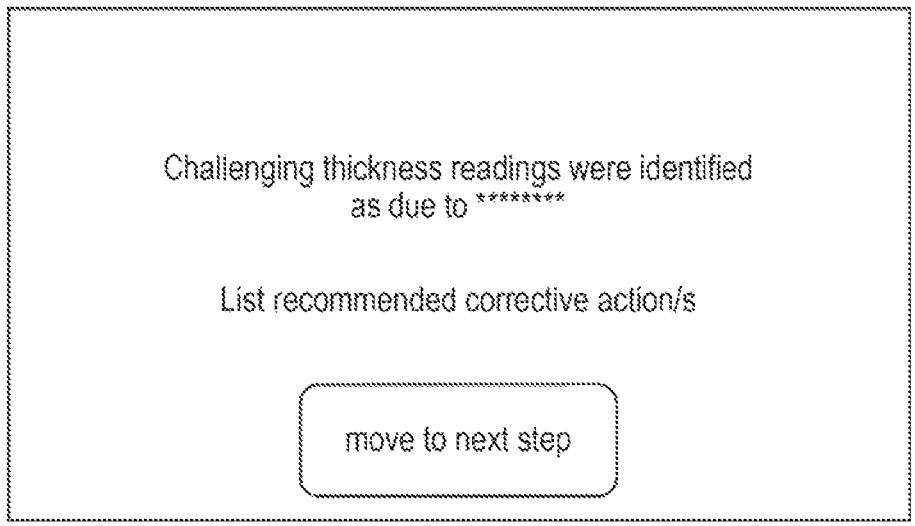
FIG. 4 is a screenshot from a GUI of a software tool implementing methods of the disclosure, such as the software tool of FIG. 1, where the user is informed as a result of the tool's analysis that a spectral characteristic has caused the waveform distortion.

FIG. 4 is a screenshot from the GUI showing how the user will be informed as a result of the analysis that a particular one or more spectral characteristics is responsible for the erroneous thickness reading and distortion of the A-scan spectrum. The GUI may then recommend particular options to the user for correcting the ultrasound data. Different options may be recommended depending on what has been determined as a result of the analysis to be causing the waveform distortion. For example, the GUI may inform the user that the A-scan spectrum cannot provide a thickness measurement despite the various options for correcting the spectrum. Alternatively, the GUI may inform the user that a particular spectral characteristic is causing the distortion (e.g. signal-to-noise ratio) and that the application of a particular means of correction of the spectrum is recommended, for example, the application of a particular algorithm to the data.

Figure 5A:
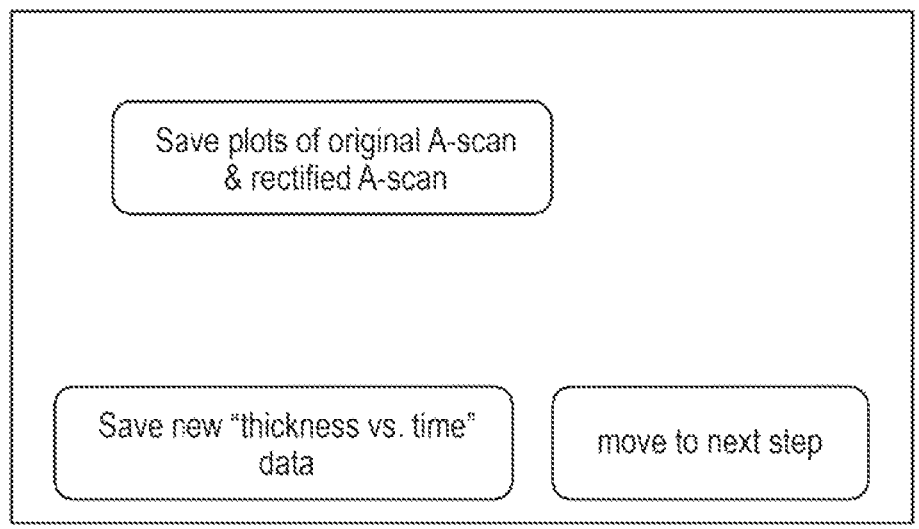
FIG. 5(a) is a screenshot from the GUI of a software tool implementing methods of the disclosure, for example the software tool of FIG. 1, giving the user the option of saving a corrected A-scan spectrum that has been corrected such that a more reliable thickness measurement can be determined from it.
Figures 5B, 6:
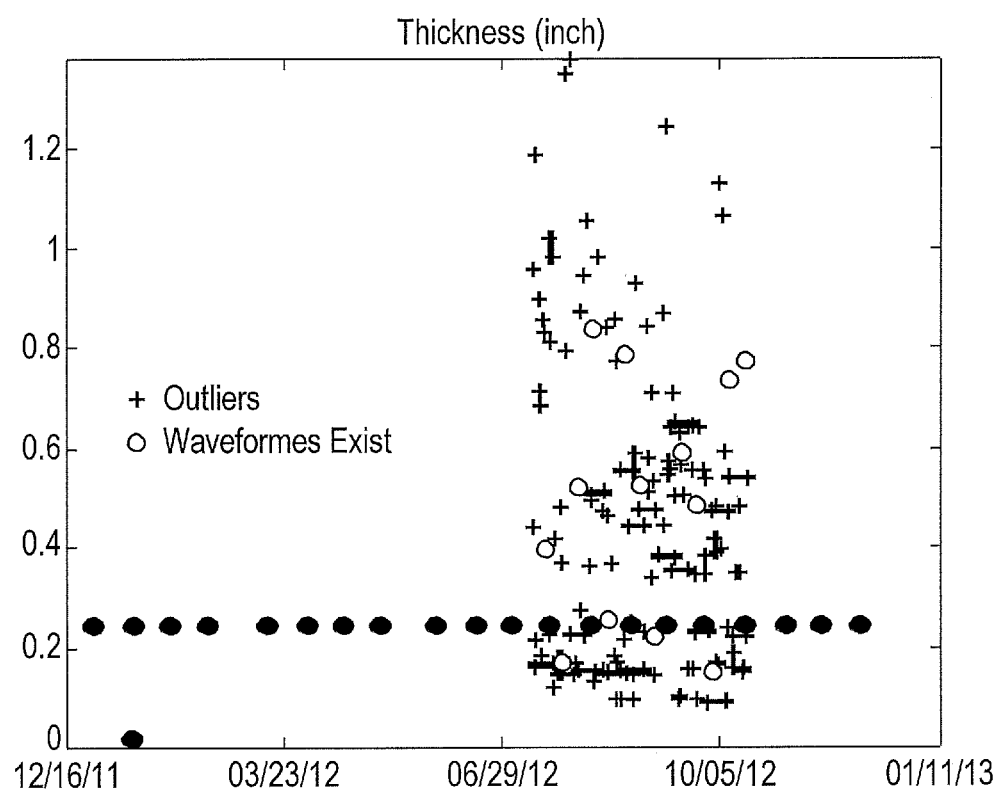
FIG. 5(b) is the graph of FIG. 2(a) with the corrected thickness measurements included.
FIG. 6 is a screenshot from the GUI of a software tool implementing methods of the disclosure, for example the software tool of FIG. 1, giving the user a choice between single sensor and multiple sensor analysis mode.

FIG. 5a is a screenshot from the graphical user interface where the user is given the option to save corrected A-scan spectra and use the corrected spectrum to generate new thickness measurements. FIG. 5b is a graph of thickness against time with the corrected A-scan spectra incorporated therein. The GUI will instruct the user that a particular spectral characteristic has been deemed to be causing the waveform distortion. It will then recommend a course of action. For example, the GUI may state that the sensor is weak, but that the A-scan spectrum has an adequate signal to noise ratio, and may then instruct a particular algorithm is applied to the spectrum as a correction. Alternatively, the GUI may inform the user that a spectrum comprises DC-offset or low frequency oscillation which is causing the waveform distortion, and recommend applying an algorithm that removes these features form the spectrum. The user will be able to save corrected A-scan spectra and incorporate them into the original group of thickness versus time measurements. In FIG. 5b, the original thickness versus time measurements of FIG. 2a can be seen with the new corrected A-scan spectra incorporated therein (shown in green). In this respect, the user will be able to see the effect of the means of correction (such as a correcting algorithm) on the A-scan and how this affects the thickness measurement.

Example 2

The software tool implementing the methods of the disclosure, such as the software tool described above with relation to Example 1, may also operate in multi-sensor mode where ultrasonic thickness measurements from a plurality of pulse-echo ultrasound devices are analysed. FIG. 6 is a screenshot from the GUI showing that the user has this option. The user may select a multiple (but not all) sensors from a site for data analysis, or all sensors from a site. The method may initially involve identifying a specific sensor where thickness measurements are outliers. Analysis as described above in example 1 for one device may then be conducted for the data.

Figure 9:
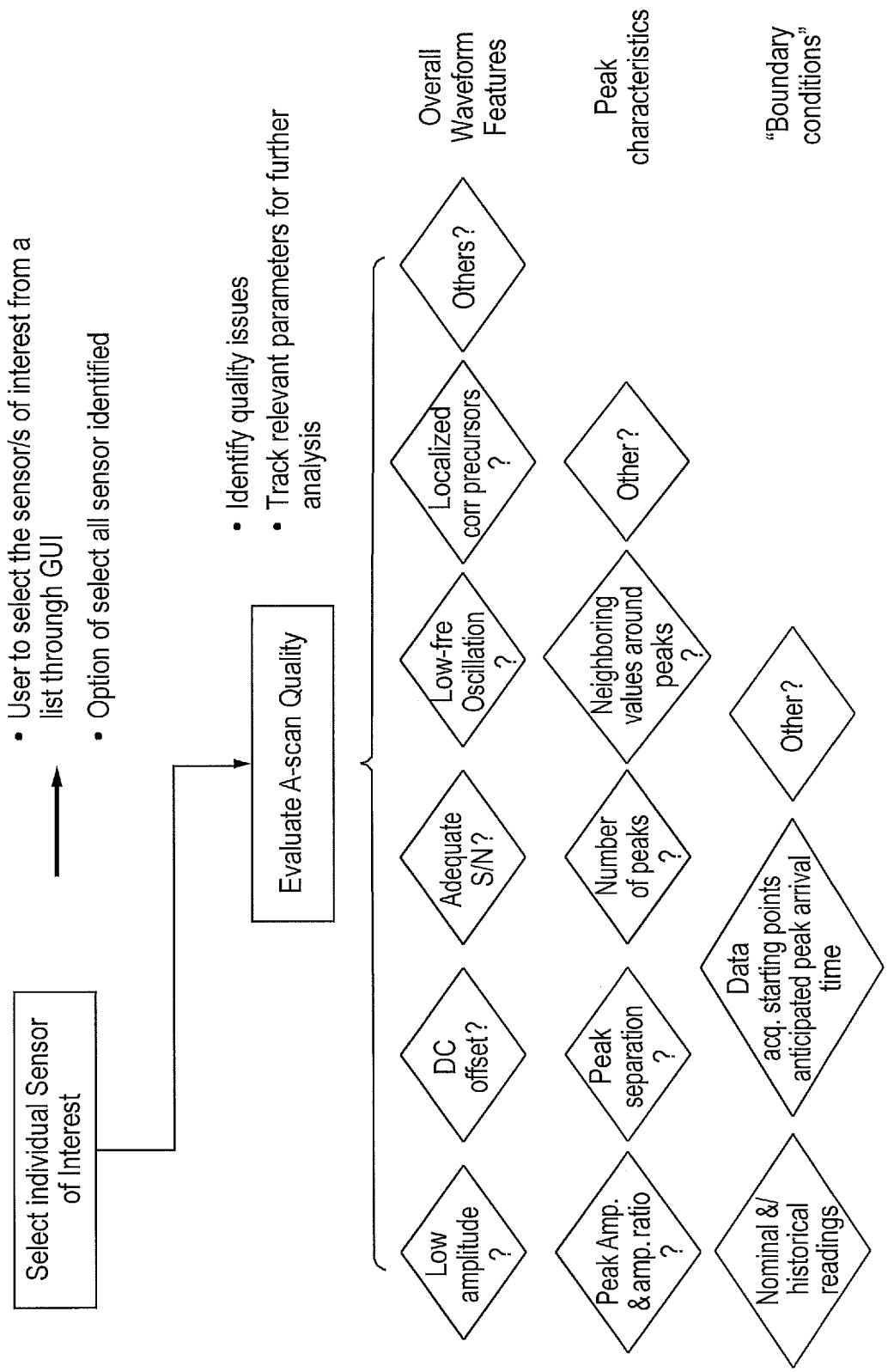
FIG. 9 is a flow chart showing analysis steps that may be carried out by a software tool implementing methods of the disclosure.

FIG. 9 is a flow chart demonstrating analysis that the software tool implementing methods of the disclosure may perform. The figure shows that initially, a sensor, or a group of sensors may be selected. For a specific A-scan spectrum indicative of a thickness measurement, the tool can analyse whether or not a specific spectral characteristic is causing the waveform to be distorted such that an accurate and reliable thickness measurement cannot be determined. As can be seen, the spectral characteristic that is analysed can be overall waveform features such as low amplitude, DC offset, adequate S/N, low frequency oscillation, localised corrosion precursors, or peak characteristics such as peak amplitude, peak separation, the number of peaks or neighbouring values around peaks. The flow chart also shows the analysis may perform comparing a value for a spectral characteristic to a nominal value.

Example 3

FIGS. 7 and 8 are examples of A-scan spectra where specific spectral characteristics are causing waveform distortion such that a reliable and accurate thickness measurement cannot be determined. FIG. 7 shows spectra where DC-offset and a poor/inadequate signal-to-noise ratio are causing the waveform distortion. FIG. 8 shows A-scan spectra where general distortion and low frequency oscillation are causing the waveform distortion. As noted above, the determination that the ultrasound data comprises at least one distorted waveform feature may be performed by computer software, such as the software tool described above in relation to Example 1.

Example 4

Figure 10:
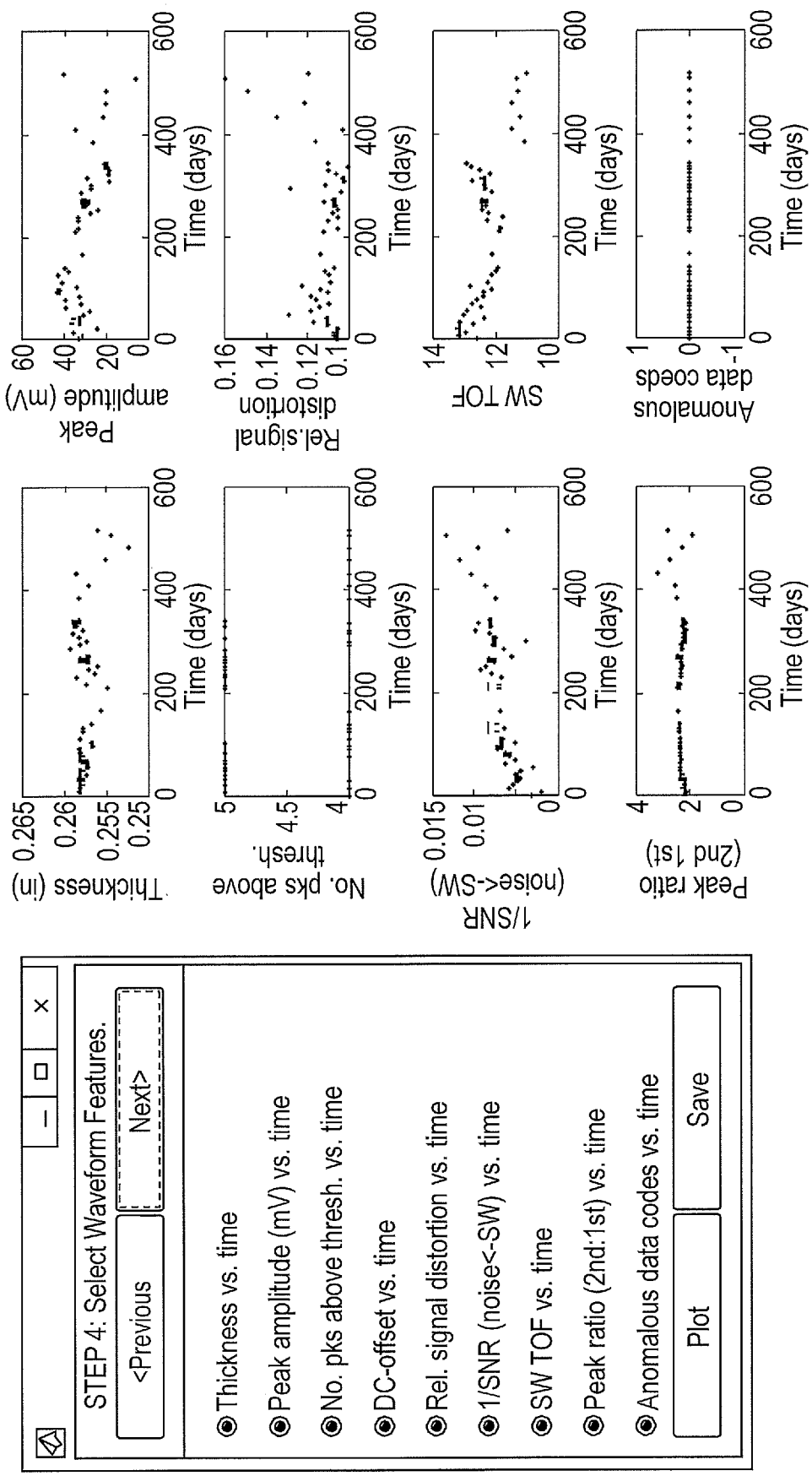
FIG. 10 is a screenshot of a GUI of a software tool implementing methods of the disclosure, for example the software tool of FIG. 1, giving the user a choice to map a spectral characteristic of an A-scan spectrum against time.
Figure 11:
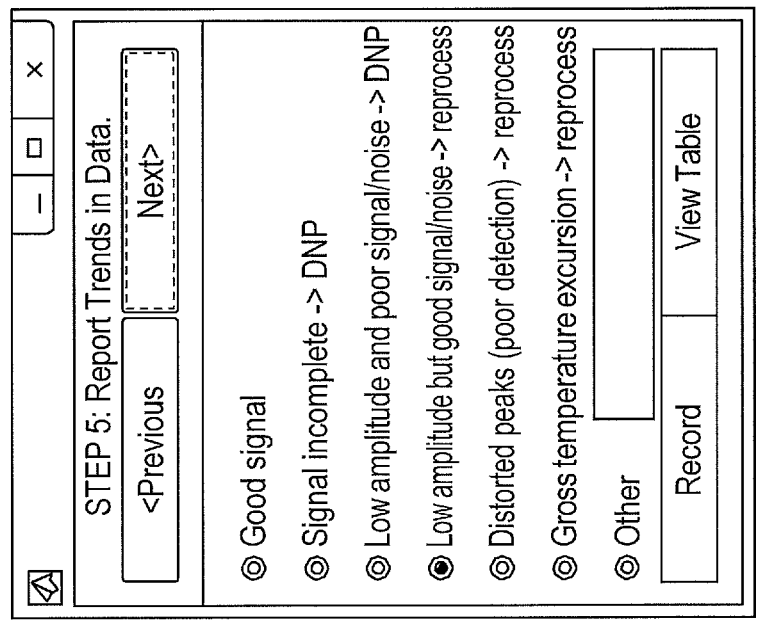

FIG. 10 shows another example of a screenshot from the GUI of a software tool implementing methods of the disclosure, such as the software tool described above in relation to Example 1, where the user is given a choice to map a specific spectral characteristic as a function of time. FIGS. 11 and 12 are screenshots from the GUI where a particular corrective action is proposed to the user on account of specific spectral characteristics having been determined as causing the waveform distortion such that a reliable thickness measurement cannot be determined.

Example 5

Figure 13:
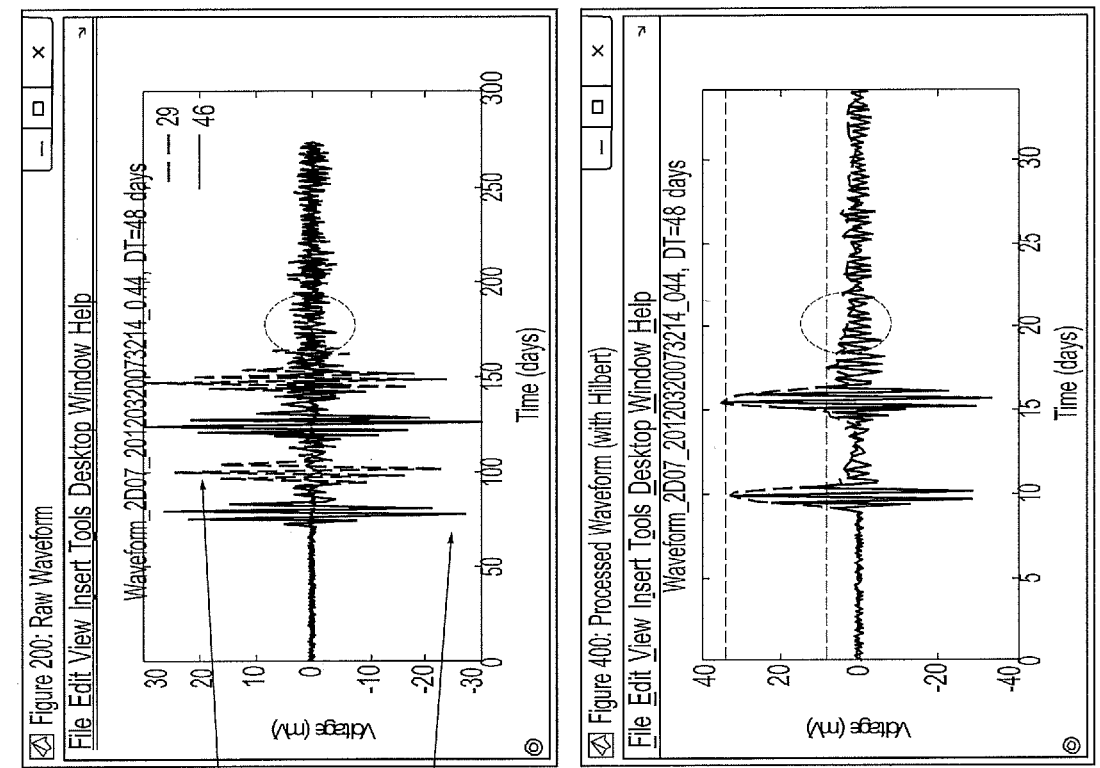
FIG. 13 shows a graph showing thickness measurements against time where there was no notable change in the pipe wall at sensor location (determined by other means)

The top left hand spectrum in FIG. 13 is a graph showing thickness measurements against time where there was no notable change in the pipe wall at sensor location (determined by other means). The large thickness change at the beginning is due to the algorithm choice in determining thickness from the A-scan. However, the overall variance in thickness measurements over time was found to be as a result of small neighbouring peaks in certain A-scan spectra causing distortion of the A-scan spectrum and hence unreliable thickness measurements. The A-scans where the neighbouring peaks were causing these effects are also shown in FIG. 13. As described above, embodiments of the disclosure may comprise determining a correction to apply to the distorted waveform features caused by the neighbouring peaks, and correcting the distorted waveform feature to obtain an improved thickness measurement.

Example 6

Figure 14:
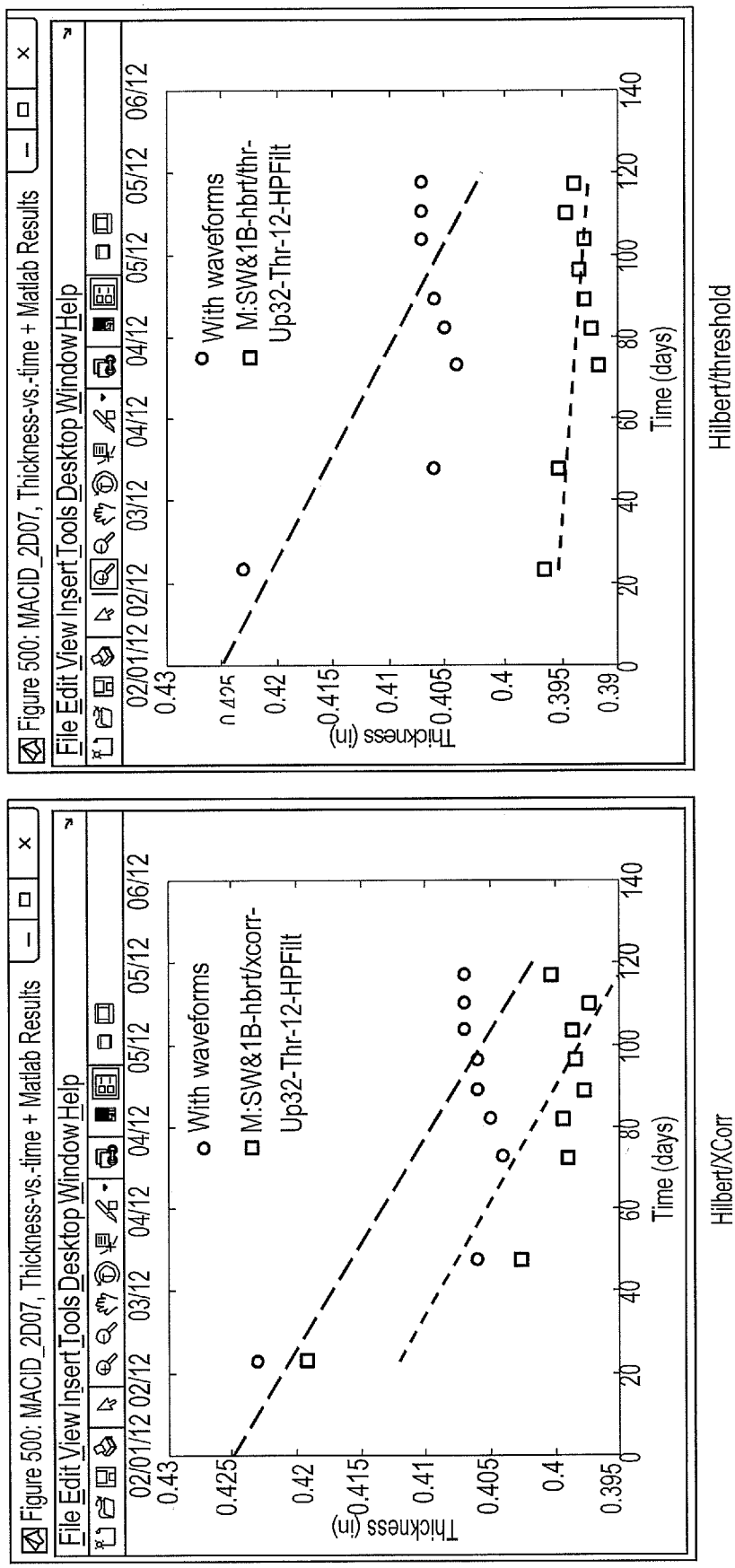
FIGS. 14 and 15 show the effects of different algorithms applied to certain outlier thickness measurements in a map of thickness against time.
Figure 15:
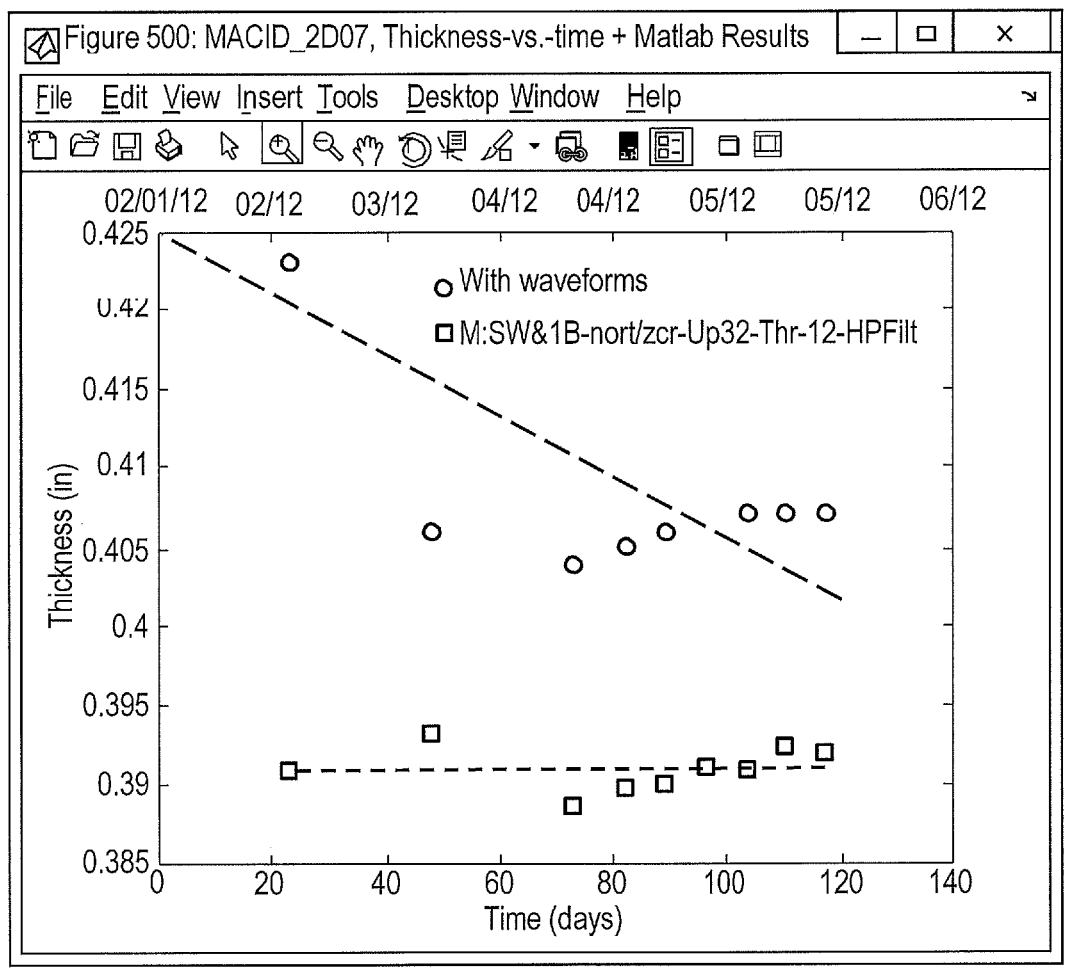

FIGS. 14 and 15 show the effect of applying different correcting algorithms to outlier thickness measurements. FIG. 14 shows the effect of cross correlation of the Hilbert transform algorithm, and Hilbert threshold algorithm, and FIG. 15 shows the effect of the Hilbert ZCR algorithm. These algorithms may be used in examples of the disclosure as described above (for example by the software tool described in relation to Example 1).

Example 7

Figure 16:
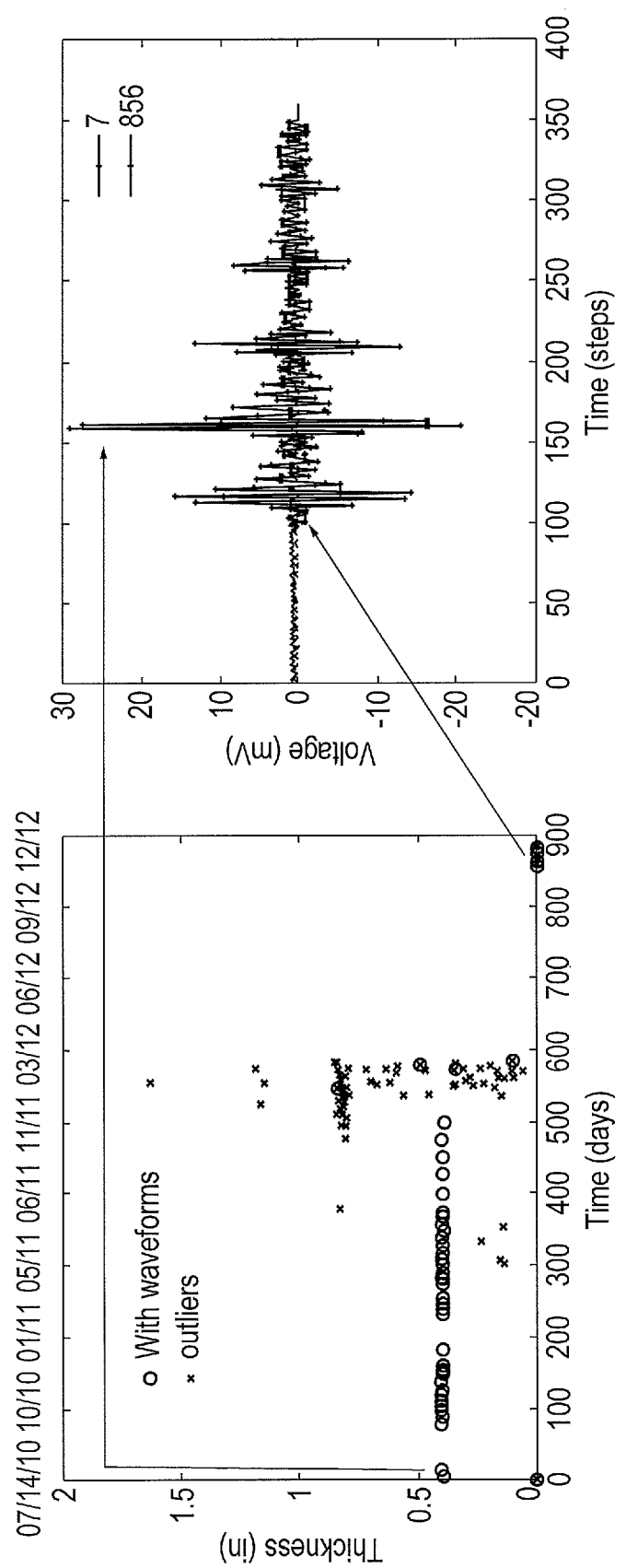
FIG. 16 shows an example of thickness measurement variance over time, where a notable change in pipe wall thickness was independently ascertained to not have changed, and also shows the A-scan spectrum of a certain outlier thickness value.

FIG. 16 is an example of thickness measurement variance over time, where notable change in pipe wall thickness was independently ascertained to not have changed (i.e. the thickness values were known to be incorrect). Using examples of the disclosure (for example, using the software tool as described above in relation to Example 1), the thickness measurement variance was found to be because of a weak waveform signal.

Embodiments of the disclosure may identify such notable changes in thickness as outliers (as indicated in FIG. 16) and thereby that the ultrasound data comprises at least one distorted waveform feature. In response to determining that the received signals comprise ultrasound data comprising at least one distorted waveform feature, embodiments of the disclosure may determine a correction to apply to the data based on a characteristic of the determined at least one distorted waveform feature, to resolve or correct the at least one distorted waveform feature and obtain a thickness measurement from the resolved or corrected data. Such embodiments may be implemented, for example, by the software tool described above in relation to Example 1.

Example 8

Figure 17:
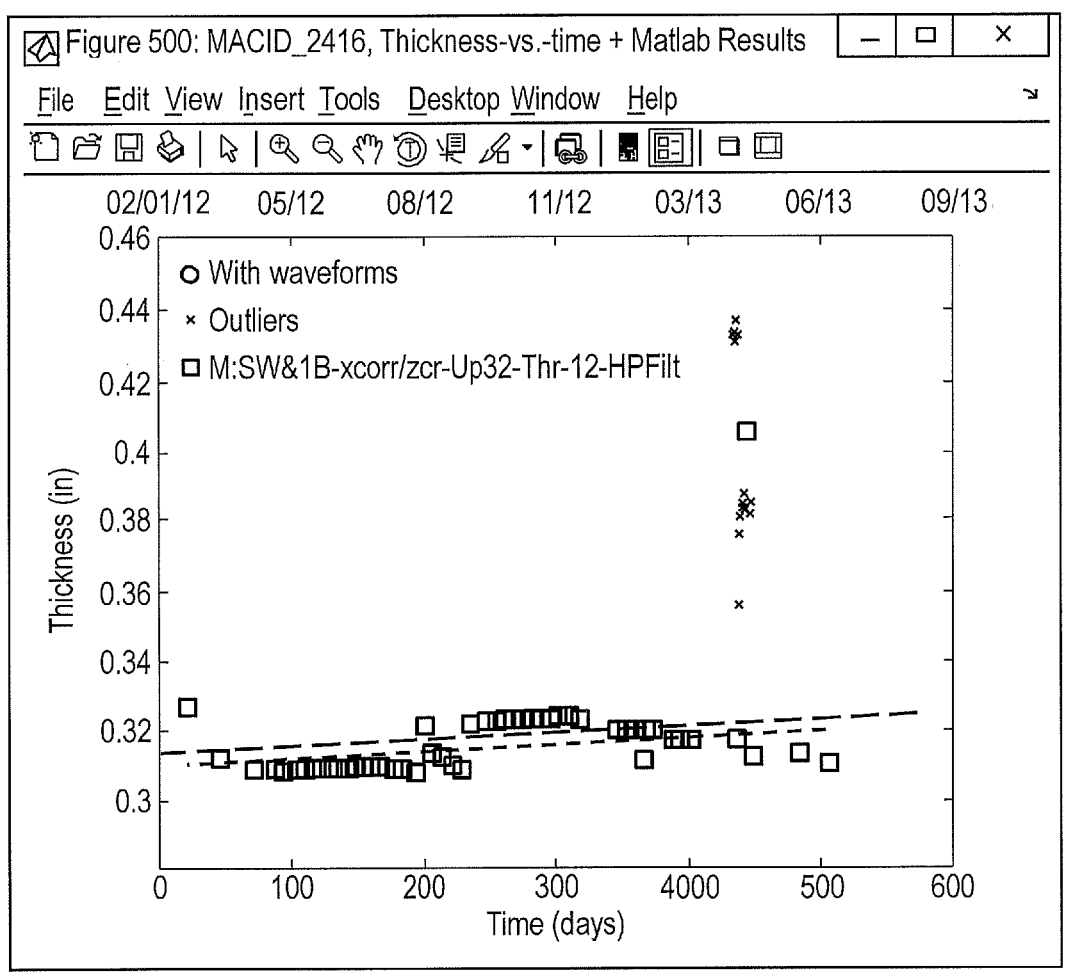
FIG. 17 is a graph showing thickness variance over time.

FIG. 17 is a graph showing thickness variance over time. Several thickness changes are observed in the graph. The drop at the $47^{th}$ day after initial installation was due to temperature change. The thickness increase at the $445^{th}$ day after initial installation is due to large waveform distortion. Embodiments of the disclosure may identify such an increase in thickness as an outlier and thereby that the ultrasound data comprises at least one distorted waveform feature, and in response to determining that the received signals comprise ultrasound data comprising at least one distorted waveform feature, determining a correction to apply to the data based on a characteristic of the determined at least one distorted waveform feature, for resolving the at least one distorted waveform feature and obtaining a thickness measurement from the resolved data. Such embodiments may be implemented, for example, by the software tool described above in relation to Example 1.

The invention claimed is:

1. A method of detecting corrosion in a conduit or container, wherein the method comprises measuring the thickness of a wall of the conduit or container with one or more pulse-echo ultrasound devices, wherein the method comprises the following steps:
   (i) receiving signals indicative of A-scan data from the one or more pulse-echo ultrasound devices, wherein the A-scan data comprises a plurality of A-scan spectra of a waveform;
   (ii) determining which of the A-scan spectra have a distorted waveform such that a reliable wall thickness measurement cannot be determined;
   (iii) analysing the A-scan spectra identified in step (ii) as having a distorted waveform to determine one or more A-scan spectral characteristics of each spectrum that are causing the distortion;
   (iv) determining a correction to apply to the A-scan spectra based on the one or more A-scan spectral characteristics of each spectrum that are causing the distortion determined in step (iii);
   (v) correcting at least one distorted waveform to resolve the waveform characteristics based on the determined correction so as to produce modified A-scan spectra;
   (vi) determining thickness measurements of the wall based on the modified A-scan spectra; and
   (vii) determining the extent to which the wall has been corroded based on the thickness measurements determined in step (vi) and additional thickness measurements determined from A-scan spectra.

2. A method according to claim 1, wherein the wall comprises the wall of an oil or natural gas transportation pipeline.

3. A method according to claim 1, wherein the wall comprises the wall of a conduit or container in an oil refinery or natural gas processing plant.

4. A method according to claim 1, wherein the one or more A-scan spectral characteristics of each spectrum that are causing the distortion comprise one or more features of the waveform.

5. A method according to claim 4, wherein the one or more features of the waveform comprise at least one of peak amplitude, peak amplitude ratio, DC offset, signal distortion, signal to noise ratio (S/N), the inverse of the signal to noise ratio (1/(S/N)), low frequency oscillation, localised corrosion precursors, or any combination thereof.

6. A method according to claim 1, wherein the one or more A-scan spectral characteristics of each spectrum that are causing the distortion comprise one or more peak characteristics.

7. A method according to claim 6, wherein the one or more peak characteristics comprise at least one of peak amplitude, peak amplitude ratio, peak separation, the number of peaks, peak ratio, neighbouring values around the peaks, or any combination thereof.

8. A method according to claim 1, wherein step (iii) of analysing the A-scan spectra to determine one or more A-scan spectral characteristics that are causing the distortion comprises mapping the one or more spectral characteristics as a function of time.

9. A method according to claim 8, wherein the one or more A-scan spectral characteristics comprise at least one of peak amplitude, peak amplitude ratio, DC offset, signal distortion, signal to noise ratio (S/N), the inverse of the signal to noise ratio (1/(S/N)), low frequency oscillation, localised corrosion precursors, peak separation, the number of peaks, peak ratio, neighbouring values around the peaks, or any combination thereof.

10. A method according to claim 1, wherein step (ii) of determining which of the A-scan spectra have a distorted waveform such that a reliable wall thickness measurement cannot be determined comprises determining whether or not a thickness measurement of the distorted waveform is an outlier in relation to thickness measurements of the plurality of A-scan spectra.

11. A method according to claim 10, wherein an outlier is defined as being more than one standard deviation from the mean value of the one or more spectral characteristics of the A-scan spectra, or from the mean value of thickness measurements taken over a period of time.

12. A method according to claim 11, wherein an outlier is defined as being more than two standard deviations from the mean value of the one or more spectral characteristics of the A-scan spectra, or from the mean value of thickness measurements taken over a period of time.

13. A method according to claim 10, wherein the thickness measurement of the distorted waveform is defined as an outlier if $(Y_i - Y_{median}) > 3 IQR$, wherein $Y_i$ is the thickness measurement of the distorted waveform, $Y_{median}$ is the median thickness measurement of a group of values, and IQR is the interquartile range of a group of values.

14. A method according to claim 10, wherein thickness measurement of the distorted waveform is defined as an outlier if $(Y_i - Y_{median}) > 10\% (Y_{median})$ and $(Y_i - Y_{median}) > \max(0.04 \text{ inch}, 5\% (Y_{median}))$, wherein $Y_i$ is the thickness measurement of the distorted waveform, $Y_{median}$ is the median thickness measurement of a group of values.

15. A method according to claim 1, wherein step (ii) of determining which of the A-scan spectra have a distorted waveform such that a reliable wall thickness measurement cannot be determined comprises determining whether or not one or more spectral characteristics of the A-scan spectra are outliers.

16. A method according to claim 10, wherein determining whether or not one or more spectral characteristics of the A-scan spectra are outliers comprises analysing thickness measurements of the plurality of A-scan spectra as a function of time.

17. A method according to claim 1, wherein step (iii) of analysing the A-scan spectra identified in step (ii) as having a distorted waveform to determine one or more A-scan spectral characteristics of each spectrum that are causing the distortion comprises analysing whether one or more specific spectral characteristics are outliers.

18. A method according to claim 17, wherein an outlier is defined as a value of a specific spectral characteristic being more than one standard deviation from the mean value of the one or more spectral characteristics.

19. A method according to claim 18, wherein the outlier is defined as being more than two, three, four or five standard deviations from the mean value of the one or more spectral characteristics of the A-scan spectra.

20. A method according to claim 1, wherein step (iv) of resolving the waveform characteristics based on the determined spectral characteristics causing the waveform distortion so as to produce modified A-scan spectra, comprises removing an outlier from the A-scan spectra.

21. A method according to claim 20, wherein an outlier is as defined as being more than one standard deviation from the mean value of thickness measurements taken over a period of time.

22. A method according to claim 1, wherein step (v) of correcting at least one distorted waveform to resolve the waveform characteristics based on the determined correction so as to produce modified A-scan spectra comprises producing a plurality of corrected A-scan spectra.

23. A method according to claim 1, wherein step (v) of correcting at least one distorted waveform to resolve the waveform characteristics based on the determined correction so as to produce modified A-scan spectra comprises excluding the spectra determined in step (ii) to have a distorted waveform from the A-scan data to produce modified A-scan spectra.

24. A method according to claim 1, wherein step (iii) of analysing the A-scan spectra identified in step (ii) as having a distorted waveform to determine one or more A-scan spectral characteristics of each spectrum that are causing the distortion comprises comparing the one or more A-scan spectra with one or more previous A-scan spectra, or one or more nominal A-scan spectra to determine the one or more A-scan spectral characteristics that are causing the distortion.

25. A method according to claim 1, comprising receiving signals from more than one pulse-echo ultrasound device situated at different locations of the wall of the container or conduit.

26. A method according to claim 25, wherein the method comprises carrying out steps (i) to (vi) on the A-scan data obtained from each of the pulse-echo ultrasound devices.

27. A method according to claim 1, wherein steps (iii) and (iv) are carried out based on more than one spectral characteristic.

28. A method for detecting corrosion in a conduit or container, wherein the method comprises measuring the thickness of a wall of the conduit or container, for use with ultrasound data obtained from one or more pulse-echo ultrasound devices comprising:
receiving signals indicative of ultrasound data, the ultrasound data comprising at least one waveform;
determining that the ultrasound data comprises at least one distorted waveform feature; and
in response to determining that the received signals comprise ultrasound data comprising at least one distorted waveform feature, determining a correction to apply to the data based on a characteristic of the determined at least one distorted waveform feature, for correcting the at least one distorted waveform feature and obtaining a thickness measurement from the corrected data.

29. A method according to claim 28, wherein the step of determining a correction to apply to the data comprises determining which A-scan spectra to exclude from the data, wherein the A-scan spectra to exclude from the data comprise A-scan spectra determined to have a distorted waveform.

30. The method of claim 28 further comprising:
correcting the at least one distorted waveform feature using the determined correction;
determining a thickness measurement of a wall of the conduit or container based on the corrected data and uncorrected data; and
determining the extent to which the wall has been corroded based on the determined thickness.

31. The method of claim 28, further comprising:
determining from the received signals a plurality of different types of distorted waveform features and applying a correction to the data specific to each different type of determined distorted waveform feature.

32. The method of claim 28 wherein determining that the ultrasound data comprises at least one distorted waveform feature comprises at least one of:
determining whether a selected portion of the ultrasound data comprises at least one outlier, wherein an outlier comprises a feature of that waveform that is outside a selected range for that feature;
determining whether the quality of the ultrasound data is below a selected threshold;
determining whether the overall waveform features of a selected portion of the ultrasound data are outside a selected threshold;
determining whether the peak characteristics of a selected portion of the ultrasound data are outside a selected threshold;
determining whether a selected portion of the ultrasound data comprises a signal to noise ratio lower than a selected threshold;
determining whether a selected portion of the ultrasound data comprises localised precursors; and
determining whether a selected portion of the ultrasound data comprises low frequency oscillations.

33. The method of claim 32 wherein an outlier comprises at least one of:
a value being at least greater than one standard deviation from a mean for a selected portion of the ultrasound data; and
an amplitude below a selected threshold for a selected portion of the ultrasound data.

34. The method of claim 32 wherein determining whether the peak characteristics of a selected portion of the ultrasound data are outside a selected threshold comprises at least one of:
determining that the separation between peaks of a selected portion of the ultrasound data is below a selected threshold;
determining that the number of peaks for a selected portion of the ultrasound data is below and/or above selected thresholds; and
comparing the absolute value of peaks for a selected portion of the ultrasound data with the absolute value of peaks for another portion of the ultrasound data.

35. The method of claim 28 wherein the wall comprises the wall of an oil or natural gas transportation pipeline.

36. An apparatus comprising a tangible, non-transitory storage medium comprising programme instructions operable to program a processor to perform steps comprising:
receiving signals indicative of A-scan data from the one or more pulse-echo ultrasound devices, wherein the A-scan data comprises a plurality of A-scan spectra;
(ii) determining which of the A-scan spectra have a distorted waveform such that a reliable wall thickness measurement cannot be determined;
(iii) analysing the A-scan spectra identified in step (ii) as having a distorted waveform to determine one or more A-scan spectral characteristics of each spectrum that are causing the distortion;
(iv) determining a correction to apply to the A-scan spectra based on the one or more A-scan spectral characteristics of each spectrum that are causing the distortion determined in step (iii);
(v) correcting at least one distorted waveform to resolve the waveform characteristics based on the determined correction so as to produce modified A-scan spectra;
(vi) determining thickness measurements of the wall based on the modified A-scan spectra; and
(vii) determining the extent to which the wall has been corroded based on the thickness measurements determined in step (vi) and additional thickness measurements determined from A-scan spectra.

37. An apparatus comprising a tangible non-transitory storage medium comprising programme instructions operable to program a processor, that upon execution, cause the apparatus to perform a method of detecting corrosion in a conduit or container, wherein the method comprises measuring the thickness of a wall of the conduit or container with one or more pulse-echo ultrasound devices, wherein the apparatus is configured to:
(i) receive signals indicative of A-scan data from the one or more pulse-echo ultrasound devices, wherein the A-scan data comprises a plurality of A-scan spectra;
(ii) determine which of the A-scan spectra have a distorted waveform such that a reliable wall thickness measurement cannot be determined;
(iii) analyse the A-scan spectra identified in step (ii) as having a distorted waveform to determine one or more A-scan spectral characteristics of each spectrum that are causing the distortion;
(iv) determining a correction to apply to the A-scan spectra based on the one or more A-scan spectral characteristics of each spectrum that are causing the distortion determined in step (iii);
(v) correcting at least one distorted waveform to resolve the waveform characteristics based on the determined correction so as to produce a plurality of resolved A-scan spectra;
(vi) determine thickness measurements of the wall based on the plurality of resolved A-scan spectra; and
(vii) determine the extent to which the wall has been corroded based on the thickness measurements determined in step (vi) and additional thickness measurements determined from A-scan spectra.

38. An apparatus according to claim 37, wherein the wall comprises the wall of an oil or natural gas pipeline.

39. An apparatus comprising one or more pulse-echo ultrasound devices and a tangible non-transitory storage medium comprising programme instructions, stored thereon and operable to program a processor, that upon execution, cause the apparatus to perform a method of detecting corrosion in a conduit or container, wherein the method comprises the following steps:
receiving signals indicative of ultrasound data, the ultrasound data comprising at least one waveform;
determining that the ultrasound data comprises at least one distorted waveform feature; and
in response to determining that the received signals comprise ultrasound data comprising at least one distorted waveform feature, determining a correction to apply to the data based on a characteristic of the determined at least one distorted waveform feature, and
correcting the at least one distorted waveform feature based on the determined correction and obtaining a thickness measurement from the corrected data.

* * * * *